United States Patent
Yumoto et al.

(10) Patent No.: US 6,249,293 B1
(45) Date of Patent: Jun. 19, 2001

(54) VIRTUAL WORLD ANIMATION USING STATUS AND RESPONSE FOR INTERFERENCE AND TIME SCHEDULE

(75) Inventors: Asako Yumoto; Kaori Suzuki; Atsuko Tada, all of Kawasaki; Satoshi Kasai, Shizuoka, all of (JP)

(73) Assignee: Fujitsu Limited, Kawasaki (JP)

( * ) Notice: Subject to any disclaimer, the term of this patent is extended or adjusted under 35 U.S.C. 154(b) by 523 days.

(21) Appl. No.: 08/517,132

(22) Filed: Aug. 21, 1995

(30) Foreign Application Priority Data

Sep. 5, 1994 (JP) .................................................. 6-211212

(51) Int. Cl.⁷ ...................................................... G06F 3/00
(52) U.S. Cl. ............................................. 345/474; 345/355
(58) Field of Search ..................................... 345/173–175, 345/949–960

(56) References Cited

U.S. PATENT DOCUMENTS

| | | | |
|---|---|---|---|
| 5,261,041 | * 11/1993 | Susman | 395/173 |
| 5,297,057 | * 3/1994 | Kramer et al. | 364/512 |
| 5,359,703 | * 10/1994 | Robertson et al. | 395/174 X |
| 5,448,694 | * 9/1995 | Wada et al. | 395/173 |
| 5,513,303 | * 4/1996 | Robertson et al. | 395/173 X |
| 5,513,307 | * 4/1996 | Naka et al. | 395/174 |
| 5,517,663 | * 5/1996 | Kahn | 395/173 X |
| 5,566,290 | * 10/1996 | Silverbrook | 395/173 |
| 5,577,185 | * 11/1996 | Tunnell et al. | 395/173 |
| 5,596,695 | * 1/1997 | Hamada et al. | 395/333 |
| 5,610,842 | * 3/1997 | Seki et al. | 364/551.02 |

FOREIGN PATENT DOCUMENTS 4-205067   7/1992 (JP) .

* cited by examiner

Primary Examiner—John Breene
(74) Attorney, Agent, or Firm—Staas & Halsey LLP

(57) ABSTRACT

A computer graphics animation editing system includes a memory for storing a status switch data unit including a starting data block and a response data block, the starting data block indicating a condition of a virtual world, the response data block indicating a response which should occur when the condition indicated by the starting data block is satisfied, a calculation block for calculating an updated condition of the virtual world, a checking block for determining whether the updated condition of the virtual world calculated by the calculation block is equal to the condition indicated by the starting data block of the status switch data unit, a start processing block for causing the response indicated by the response data block to start when the checking block determines that the updated condition of the virtual world is equal to the condition indicated by the starting data block of the status switch data unit, and a display unit for displaying the virtual world including the result obtained by the start processing block.

16 Claims, 23 Drawing Sheets

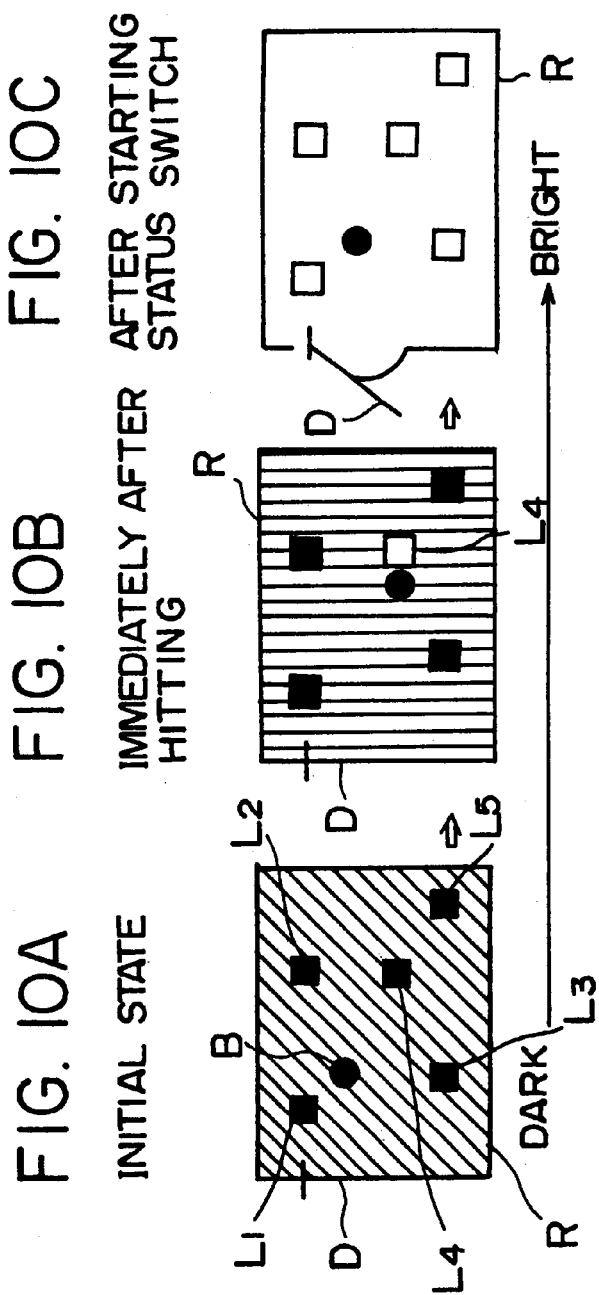

FIG. 11

```
┌─ STATUS SWITCH DATA LIST ──────────────────────────────────────────┐
│  ┌─ STATUS SWITCH DATA UNIT 1 ──────────────────────────────────┐  │
│  │  ┌────────────────────────────────────────────────────────┐  │  │
│  │  │ 1. SWITCH OBJECT = DOOR                                │  │  │
│  │  │ 2. SWITCH TYPE = TEXTURE                               │  │  │
│  │  │ 3. DETAILED DATA = TOTAL BRIGHT LEVEL (R.G.B) ≧ THRESHOLD│ │  │
│  │  │ 4. START FLAG = IF …,                                  │  │  │
│  │  └────────────────────────────────────────────────────────┘  │  │
│  │                                                                │  │
│  │  ┌────────────────────────────────────────────────────────┐  │  │
│  │  │ 5. RESPONSE OBJECT = DOOR                              │  │  │
│  │  │ 6. RESPONSE MOTION = DOOR IS PIVOTED AND OPENED        │  │  │
│  │  │ 7. WAITING STATUS = START WAITING STATE                │  │  │
│  │  └────────────────────────────────────────────────────────┘  │  │
│  └──────────────────────────────────────────────────────────────┘  │
└────────────────────────────────────────────────────────────────────┘
```

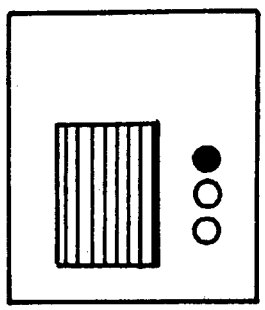
FIG. 20D ANIMATION BASED ON NEW STATUS SWITCH DATA (BALL IS MOVED)
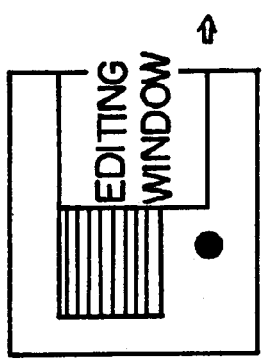
FIG. 20C SAMPLING
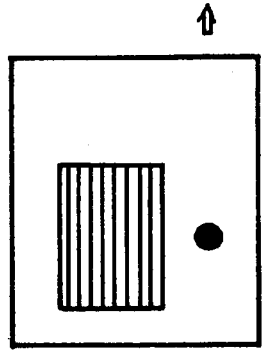
FIG. 20B EDITING MODE
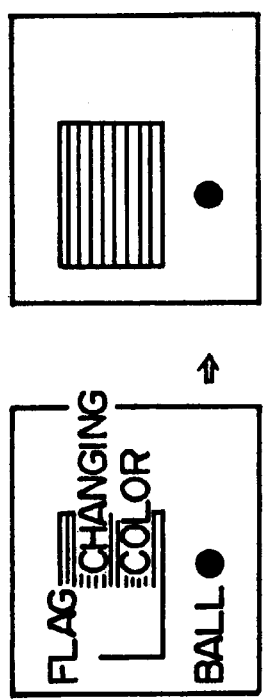
FIG. 20A INITIAL TRIAL

FIG. 22A

PULL DOWN MENU

| STATUS SWITCH |
| SWITCH LIST |
| SAMPLE LIST |
| SAMPLING |

FIG. 22B

STATUS SWITCH LIST EDITOR

| SWITCH OBJECT | FLAG | FLAG |
|---|---|---|
| RESPONSE OBJECT | BALL | BALL |
| WAITING STATUS | WAITING TO BE IN STATE | WAITING TO BE NOT IN STATE |
| USE/NOT USE | USE | NOT USE |

NEW    EDIT    DELETE        CANCEL    TERMINATE

FIG. 22C

STATUS SAMPLING EDITOR

| OBJECT | FLAG | FLAG |
|---|---|---|
| SAMPLING | COLOR | POSITION |

EDIT    DELETE        CANCEL    TERMINATE

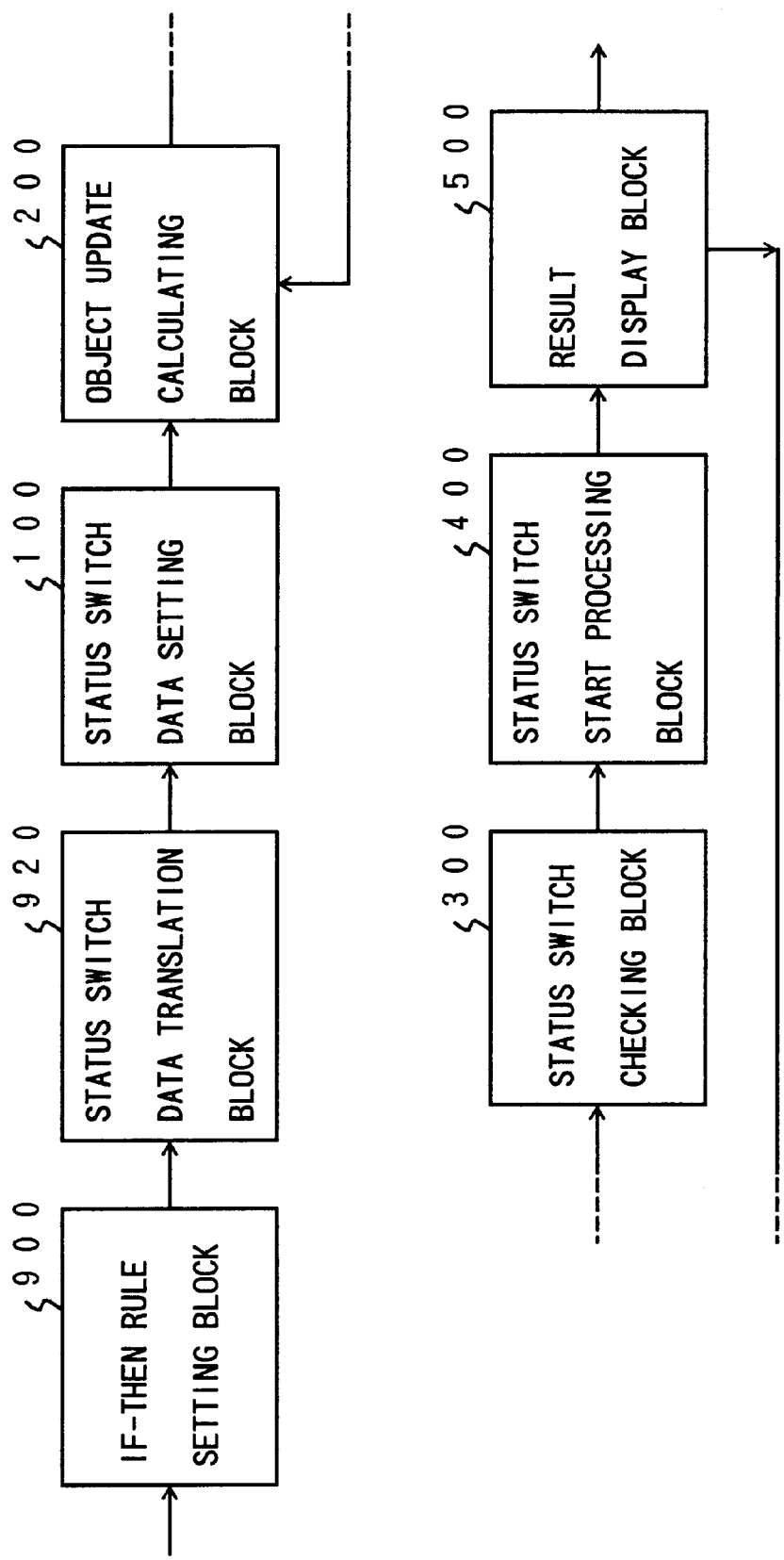

VIRTUAL WORLD ANIMATION USING STATUS AND RESPONSE FOR INTERFERENCE AND TIME SCHEDULE

BACKGROUND OF THE INVENTION (1) Field of the Invention

The present invention generally relates to a computer graphics (CG) animation editing system, and more particularly to a computer graphics animation editing system for editing CG animation so that objects in the CG animation start or stop moving when the objects enter into predetermined states.

(2) Description of the Related Art

As a result of the progress of computer technology, we have frequent opportunities to use computer graphics animation by which a virtual world can be experienced. The CG animation has been developed such that a complex world having a higher reality can be experienced. For example, in a virtual world experienced by means of recent CG animation, not only is a line-of-sight moved, but also various CG objects are moved.

A conventional CG animation editing system can edit in detail motions of objects constructing a virtual world. Further, a succession of motions of an object can be edited based on an animation making method using a framing technique. The succession of motions of an object in a CG animation are represented by conditions under which the motions start.

However, in the conventional CG animation editing system, as to the succession of motions of objects in a CG animation, only simple editing can be performed. For example, a simple succession of motions defined by using a condition that subjects are brought into contact with each other can be edited. Also a simple succession of motions defined by using a timer can be edited.

Thus, the conventional CG animation editing system can not edit a complex succession of motions of objects as desired by a user.

SUMMARY OF THE INVENTION

Accordingly, a general object of the present invention is to provide a novel and useful computer graphics animation editing system in which the disadvantages of the aforementioned prior art are eliminated.

A specific object of the present invention is to provide a computer graphics animation editing system in which complex succession of motions of objects in a CG animation can be easily edited by a user.

The above objects of the present invention are achieved by a computer graphics animation editing system comprising: storage means for storing a status switch data unit including a starting data block and a response data block, the starting data block indicating a condition of a virtual world, the response data block indicating a response which should occur when the condition indicated by the starting data block is satisfied; calculation means for calculating an updated condition of the virtual world; checking means for determining whether the updated condition of the virtual world calculated by the calculation means is equal to the condition indicated by the starting data block of the status switch data unit; start processing means for causing the response indicated by the response data block to start when the checking means determines that the updated condition of the virtual world is equal to the condition indicated by the starting data block of the status switch data unit; and display means for displaying the virtual world including the result obtained by the start processing means.

According to the present invention, since motions of objects in the virtual world are controlled using the status switch data unit, complex succession of motions of the objects can be easily edited.

The above objects of the present invention are also achieved by a computer graphics animation editing system comprising: first storage means for storing an interference switch data unit including a starting data block and a response data block, the starting data block indicating objects interfering with each other in a virtual world, the response data block indicating a first response which should occur when interference with the objects indicated by the starting data block starts or stops; second storage means for storing a status switch data unit including a starting data block and a response data block, the starting data block indicating a condition of the virtual world, the response data block indicating a second response which should occur when the condition indicated by the starting data block is satisfied; provisional calculation means for provisionally calculating an updated condition of the virtual world; interference determination means for determining whether or not the objects interfere with each other in the virtual world under the updated condition calculated by the provisional calculation means; start determination means for determining, based on a result obtained by the interference determination means, whether or not the first response indicated by the response data block of the interference switch data unit should occur; interference start processing means for, when the start determination means determines that the first response should occur, causing the first response to start; condition decision means for deciding a condition in the virtual world, based on existence or nonexistence of interference of the objects, by accepting the result from the provisional calculation means, by canceling the result from the provisional calculation means or by recalculating using the provisional calculation means; checking means for determining whether the condition of the virtual world decided by the condition decision means is equal to the condition indicated by the starting data block of the status switch data unit; start processing means for causing the second response indicated by the response data block of the status switch data unit to start when the checking means determines that the condition decided by the condition decision means is equal to the condition indicated by the starting data block of the status switch data unit; and display means for displaying the virtual world including the result obtained by the start processing means.

According to the present invention, since motions of objects in the virtual world are controlled using both the interference switch data unit and the status switch data unit, a more complex succession of motions of objects can be easily edited.

The above objects of the present invention are also achieved by a computer graphics animation editing system comprising: first storage means for storing time schedule data indicating a time schedule by which motions of objects proceed step by step; second storage means for storing a status switch data unit including a starting data block and a response data block, the starting data block indicating a condition of the virtual world, the response data block indicating a response which should occur when the condition indicated by the starting data block is satisfied; time calculation means for calculating a time in a next step; schedule determination means for determining, with reference to the time schedule data stored in the first storage means, whether or not there is an object to be moved at the time calculated by the time calculation means; scheduled start processing means for, when the schedule determination means determines that there is an object to be moved, causing a motion of the object to start; calculation means for calculating an updated condition of the virtual world including the moved object; checking means for determining whether the updated condition of the virtual world calculated by the calculation means is equal to the condition indicated by the starting data block of the status switch data unit; start processing means for causing the response indicated by the response data block to start when the checking means determines that the updated condition of the virtual world is equal to the condition indicated by the starting data block of the status switch data unit; and display means for displaying the virtual world including the result obtained by the start processing means.

According to the present invention, since motions of objects in the virtual world are controlled using the time schedule data and the status switch data unit, a more complex succession of motions of objects can be easily edited.

BRIEF DESCRIPTION OF THE DRAWINGS

Other objects, features and advantages of the present invention will be apparent from the following detailed description when read in conjunction with the accompanying drawings, in which:

FIGS. 10A, 10B and 10C comprise a diagram illustrating an animation edited by the system shown in FIG. 8;

FIG. 11 is a diagram illustrating an example of the status switch data used in the system shown in FIG. 8;

FIGS. 20A, 20B, and 20C and 20D comprise a diagram illustrating an animation edited by the system shown in FIG. 18;

FIGS. 22A, 22B and 22C are diagrams illustrating examples of windows on a display screen in an editing operation; and FIG. 23 is a functional block diagram illustrating a computer graphics animation editing system according to a fifth embodiment of the present invention.

DESCRIPTION OF THE PREFERRED EMBODIMENTS

A description will be given, with reference to FIG. 1, of a hardware structure of a computer graphics animation editing system (hereinafter referred to as a CG animation editing system) according to embodiments of the present invention.

Figure 1:
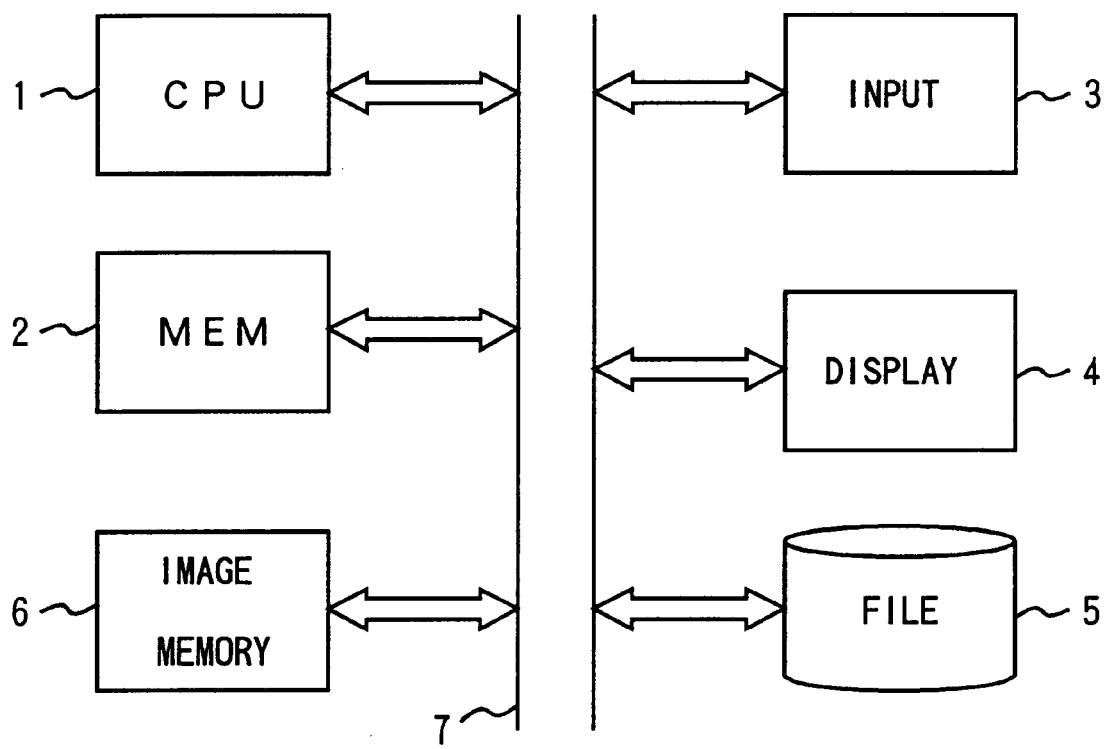
FIG. 1 is a block diagram illustrating a hardware structure of a computer graphics animation editing system according to embodiments of the present invention.

Referring to FIG. 1, a CPU (Central Processing Unit) 1, a memory unit 2, an input unit 3, a display unit 4, an external storage unit 5 and an image memory 6 are connected with each other by a bus 7. The external storage unit 5 stores various files required for animations. The memory 2 has an area for expanding programs for editing animations and an area for expanding information of the files read out from the external storage unit 5. Image information for each frame in an animation is expanded in the image memory 6. An image corresponding to the image information stored in the image memory 6 is displayed by the display unit 4. A user inputs information required for the editing of the animation using the input unit 3. The CPU 1 executes editing processes in accordance with the programs stored in the memory unit 2. That is, functions of the CG animation editing system are formed by the CPU 1 and the programs stored in the memory unit 2.

Figure 2:
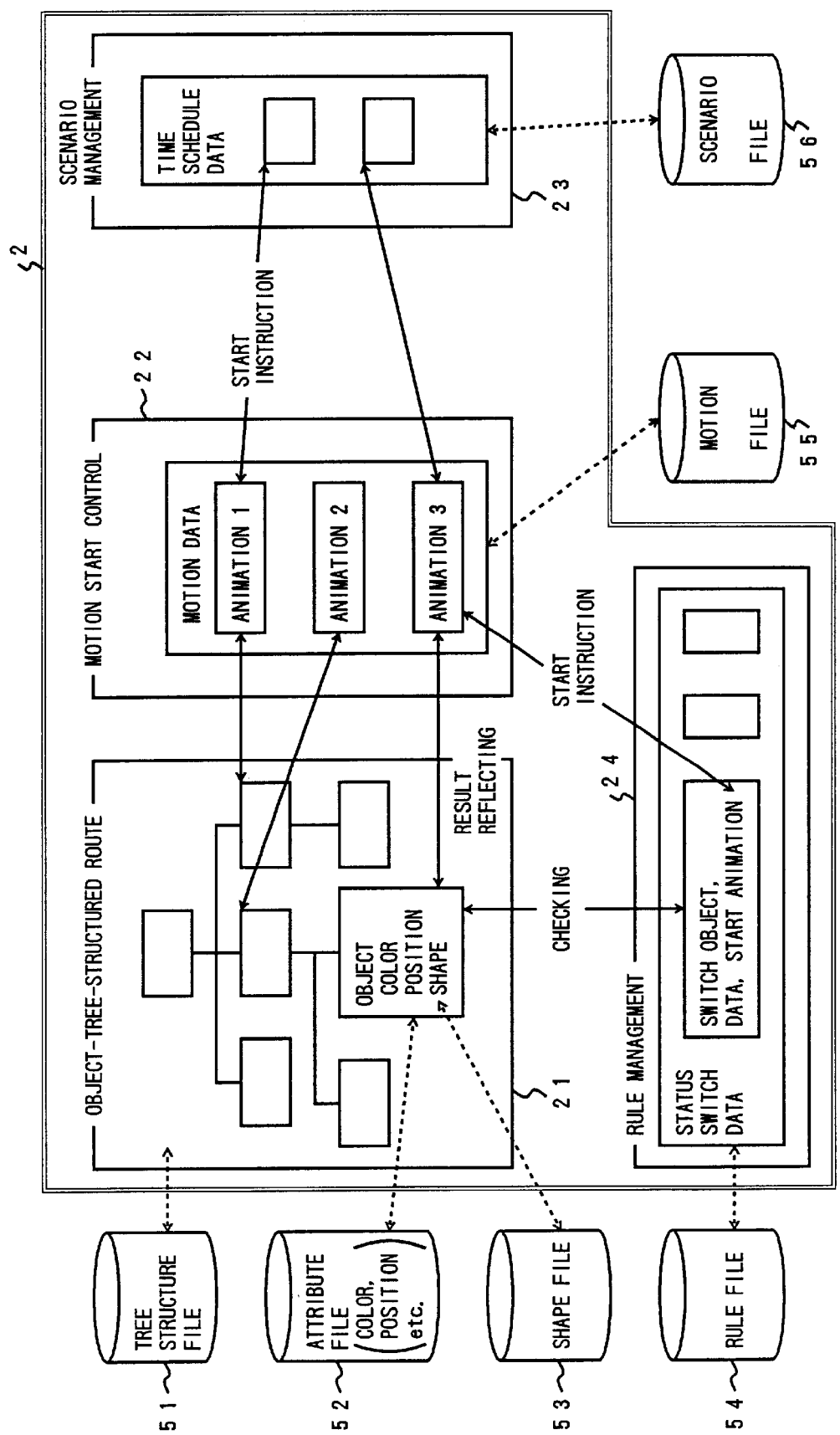
FIG. 2 is a block diagram illustrating a state of a system memory in which information is expanded.

The information in the files regarding the animations are expanded in the memory unit 2 as shown in FIG. 2. Referring to FIG. 2, the files stored in the external storage unit 5 include a tree structure file 51, an attribute file 52, a shape file 53, a rule file 54, a motion file 55 and a scenario file 56. The tree structure file 51 is provided with tree-structured relationships among objects in animations. The attribute file 52 is provided with attributes of the respective objects. The attributes are, for example, colors, positions and the like. The shape file 54 is provided with shapes of the respective objects. The rule file 54 is provide with rules of motions of the respective objects in the animations. Status switch data is in the rule file 54 as data representing the rules of the motions of the respective objects. The motion file 55 is provided with motion data representing motions of the respective objects in the animations. The scenario file 56 is provided with time schedule data representing schedules of motions of the respective objects in the animations.

The information in the respective files 51, 52, 53, 54, 55 and 56 are expanded in the memory unit 2 as follows.

Referring to FIG. 2, the area of the memory unit 2 in which information of the files are to be expanded has an object-tree-structured route portion 21, a motion start control portion 22, a scenario management portion 23 and a rule management portion 24. The tree-structure-relationships in the tree structure file 51 are expanded in the object-tree-structured route portion 21. The attributes of an object in the attribute file 52 are set for the object in the object-tree-structured route portion 21. The shape of an object in the shape file 53 is set for the object in the object-tree-structured route portion 21. The data including the status switch data in the rule file is expanded in the rule management portion 24. The motion data for objects in the animations in the motion file 55 is expanded in the motion start control portion 22. The time schedule data for the animations in the scenario file 56 is expanded in the scenario management portion 23.

The time schedule data in the scenario management portion 23 is dynamically coupled to the motion data for the animations in the motion start control portion 22. The motion data for the animations is dynamically coupled to the respective objects in the object-tree-structured route portion 21 so that changes of scenes based on the motion data for the animations are reflected in the attributes (colors, positions, shapes and the like) for the respective objects. The attributes and the shape set for the respective objects in the object-tree-structured route portion 21 are dynamically coupled to the status switch data in the rule management portion 24. Further, the status switch data in the rule management portion 24 is dynamically coupled to the motion data for the animations in the motion start control portion 22.

A description will now be given of a first embodiment of the present invention. In the first embodiment, functional blocks of the CG animation editing system are formed as shown in FIG. 3.

Figure 3:
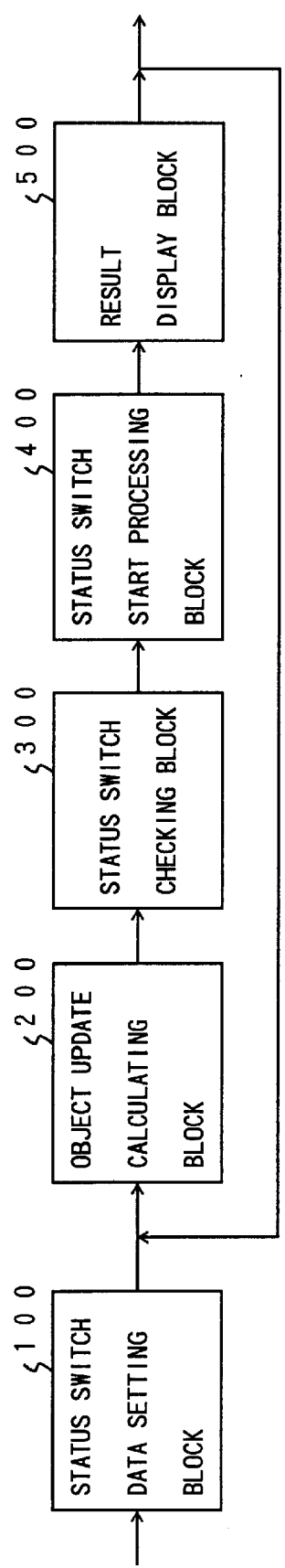
FIG. 3 is a functional block diagram illustrating a computer graphics animation editing system according to a first embodiment of the present invention.

Referring to FIG. 3, the CG animation editing system has a status switch data setting block 100, an object update calculating block 200, a status switch checking block 300 and a status switch start processing block 400, all of which are formed by the CPU 1 and the programs. The CG animation editing system has also a result display block 500 which is formed by the display unit 4.

The status switch data setting block 100 sets, in the rule management portion 24 of the memory unit 2, conditions (status switch data) under which motions of objects defined in the system start. The status switch data contains conditions for one or a plurality of objects. The status switch has a function for, when the conditions occur in an animation, making corresponding motions start. Some or all attributes which can be set as object data are referred to as the status switch data.

The object update calculating block 200 updates motion data (colors, positions, shapes and the like) of the respective objects in a virtual world (an animation) at constant time step intervals from a starting time of the animation. The results obtained by the object update calculating block 200 are reflected in the attributes for the respective objects in the object-tree-structured route portion 21. The status switch checking block 300 refers to attributes set for the objects in the object-tree-structured route portion 21 and the status switch data in the rule management portion 24. The status switch checking block 300 then checks whether or not conditions represented by the attributes, in which attributes the results obtained by the object update calculating block 200 are reflected, correspond to conditions represented by the status switch data.

When it is determined that the conditions represented by the attributes correspond to the conditions represented by the status switch data, the status switch start processing block 400 causes motions corresponding to the status switch data to start. The object update calculating block 200 updates the motion data in the motion start control portion 22 in accordance with the motions caused to start by the status switch start processing block 400.

The result display block 500 displays objects in the virtual world which is updated. Processes in the object update calculating block 200, the status switch checking block 300, the status switch start processing block 400 and the result display unit 500 are repeatedly performed until an interruption/termination instruction for the animation occurs.

Figure 4:
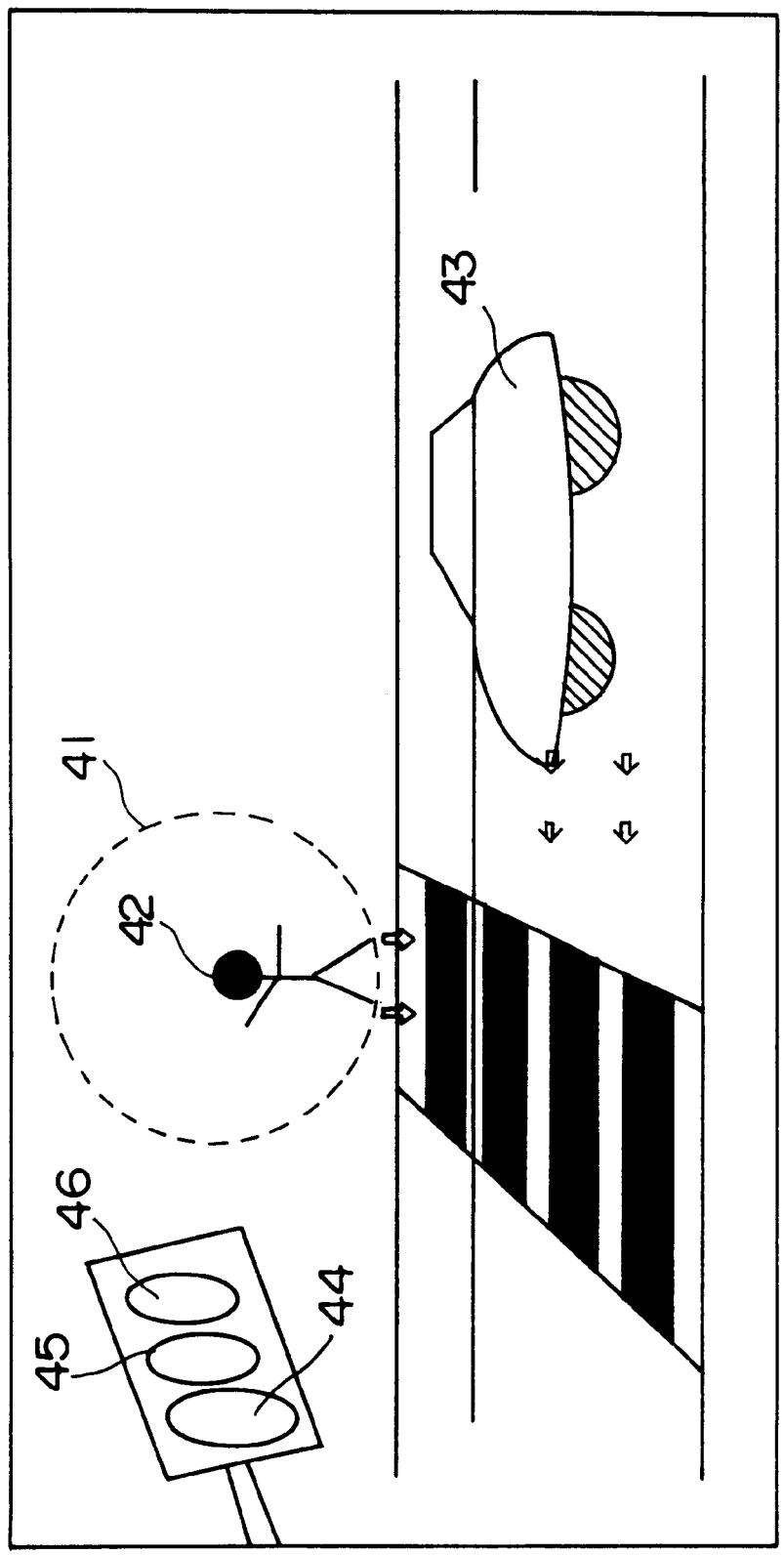
FIG. 4 is a diagram illustrating an example of a virtual world represented by a CG animation.

FIG. 4 shows an example of a virtual world. Referring to FIG. 4, the virtual world includes a space 41, a man 42, an automobile 43 and a traffic signal having a green signal light 44, a yellow signal light 45 and a red signal light 46.

In the virtual world, when the man 42 approaches a pedestrian crossing and enters the space 41, the signal light is changed and the automobile 43 stops. The motions of the respective objects (the man 42, the signal lights 44, 45 and 46 and the automobile 43) have been registered in the system. That is, a motion in which the automobile 43 moves on a roadway and motions in which the respective signal lights 44, 45 and 46 have been set as the motion data in the system. The man 43 may be moved due to interactive operations of a user. However, in this embodiment, for the sake of simplification, only a motion in which the man 43 approaches the pedestrian crossing and enters the space 41 is considered.

A time period of a motion in which the yellow signal light 45 is in an on state is set in the system, so that the yellow signal light 45 is turned off when a predetermined time has elapsed since turning on the yellow signal light 45. Motions of other objects which start are continued until termination (stop) instructions are issued. The motions of the man 42, the automobile 43 and the signal lights 44, 45 and 46 are started by using the status switch, so that the virtual world is constructed.

In accordance with the following conditions under which the respective motions start are satisfied, an animation is actualized.

(1) When the man 42 enters the space 41, the blue signal light 44 is turned off.

(2) When the man 42 enters the space 41, the yellow signal light 44 is turned on.

(3) When the man 42 enters the space 41, the motion of the automobile 43 is reduced to a full stop.

(4) Only when both the green signal light 44 and the yellow signal light 45 are tuned off, the red signal light 46 is turned on.

In an initial state, the green signal light 44 is in the on state and the automobile 43 moves on the roadway.

Figure 5:
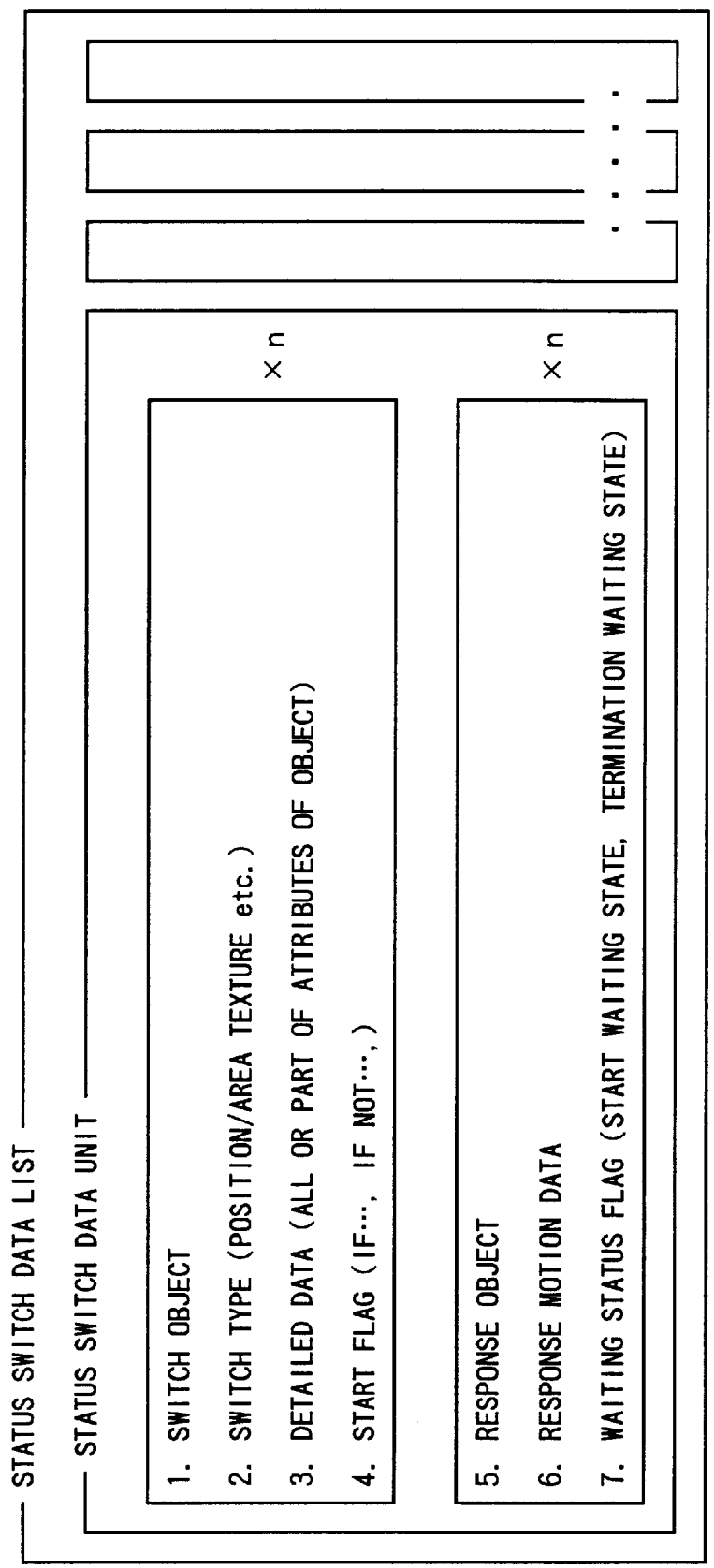
FIG. 5 is a diagram illustrating a format of status switch data.

The status switch data has a format as shown in FIG. 5. Referring to FIG. 5, a status switch data list is formed of a plurality of status switch data units. Each of the status switch data units has one or a plurality of starting data blocks and one or a plurality of response data blocks. Each of the starting data blocks includes first through fourth data items and each of the response data blocks includes fifth through seventh data items.

The first data item indicates a switch object. The second data item indicates a switch type (a position/area type, a texture type and so on). The third data item indicates detailed data (all or some of attributes of the object). The fourth data item indicates a start flag (if . . . or if not . . . ). The fifth data item indicates an object whose motion is to be started. This object is referred to as a response object. The sixth data item indicates a response motion to be started. The seventh data item indicates a waiting status flag (start waiting or termination waiting).

Each of the starting data blocks represents an object (the switch object) which is a cause of starting a motion of an object and a condition (the first data item to the fourth data item). Each of the response data blocks represents a response object whose motion is to be started under the condition and motion data for the response object (the fifth data item through the seventh data item).

The switch type indicated by the second data item represents a type of the detailed data in the third data item. If the switch type in the second data item is the "position/area" type, the detailed data in the third data item is position/area data which represents a position or an area. In this case, when the switch object indicated in the first data item reaches the position or the area represented by the detailed data in the third data item, a response motion, of the response item, defined by the response motion data in the sixth data item is started. The detailed data in the third data item may be used to represent attributes, such as positions, areas, textures, lighting states and shapes, of various objects. The objects include various circumstances, such as light, a line-of-vision and wind, other than concrete objects.

The start flag in the fourth data item indicates whether the response motion is started when the switching condition (see the first data item through the third data item) is satisfied or when not satisfied. The waiting status flag in the seventh data item indicates that, when the condition defined by the starting data block occurs, the response motion (see the fourth data item through the sixth data item) is to be started (the start waiting state) or be terminated (temporarily interrupted)(the termination waiting state).

Figure 6:
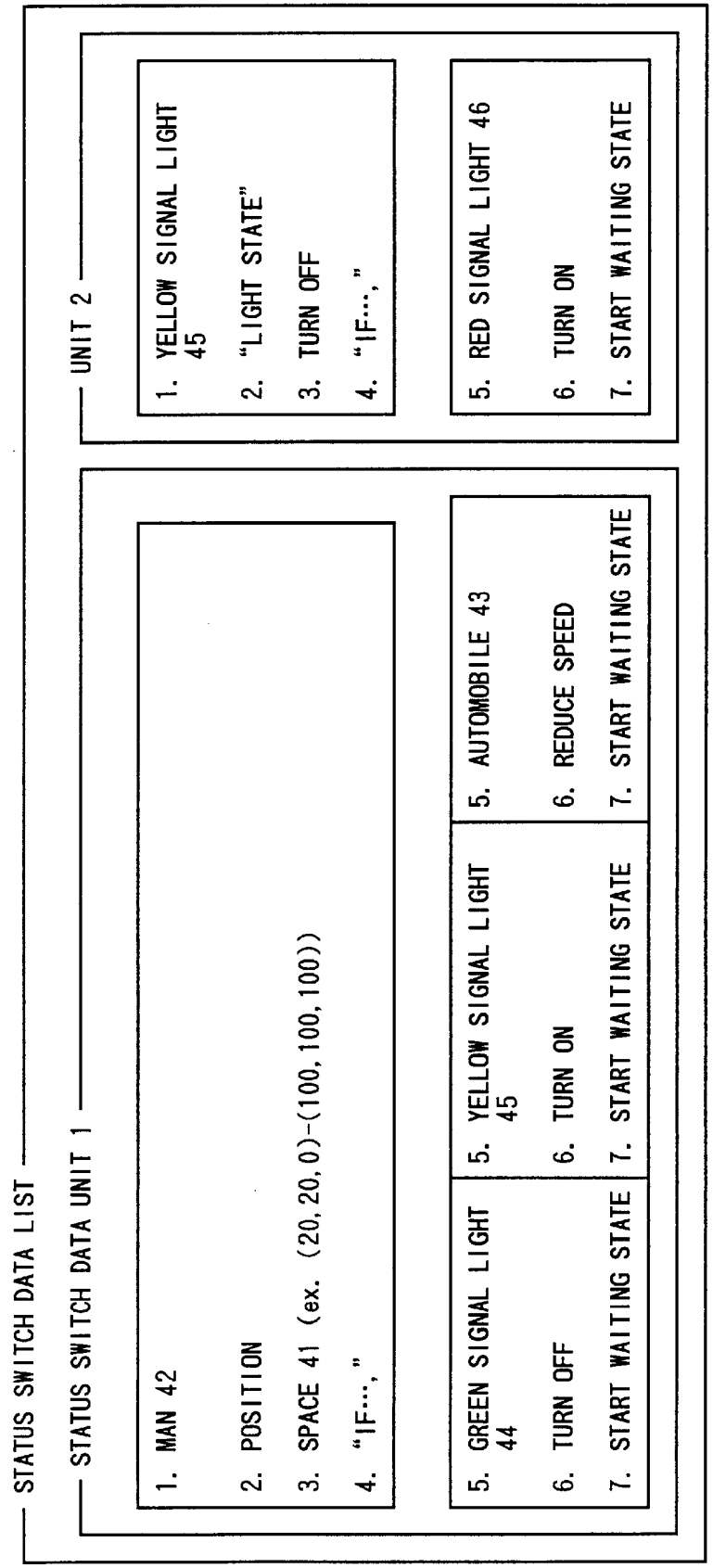
FIG. 6 is a diagram illustrating an example of the status switch data.

In order to make an animation as shown in FIG. 4, the status switch data is set, for example, as shown in FIG. 6. Referring to FIG. 6, the status switch data list includes two status switch data units: the first status switch data unit and the second status switch data unit. The first status switch data unit includes a starting data block and three response data blocks.

In the starting data block, the man 42 is set as the switch object in the first data item and the position type is set as the switch type in the second data item. Further, a definition of the space 41 is set as the detailed data in the third data item (e.g., (20, 20, 0)–(100, 100, 100)) and a condition "if a switching condition is satisfied, . . . " is set as the start flag in the fourth data item.

In the first response data block, the green signal light 44 is set as the response object in the fifth data item. A motion in which a light is turned off is set as the response motion in the sixth data item. The waiting status flag is set in the start waiting state.

In the second response data block, the yellow signal light 45 is set as the response object in the fifth data item. A motion in which a light is turned on is set as the response motion. The waiting status flag is set in the start waiting state.

In the third response data block, the automobile 43 is set as the response object. A motion in which the speed of the automobile 43 is reduced is set as the response motion. The waiting status flag is set in the start waiting state.

The second status switch data unit includes a starting data block and a response data block. In the starting data block, the yellow signal light 45 is set as the switch object. A "light state" is set as the switch type. A motion in which a light is turned off is set as the response motion. A condition "if the switching condition is satisfied, . . . " is set as the start flag. In the response data block, the red signal light 46 is set as the response object. A motion in which a light is turned on is set as the response motion. The waiting status flag is set in the start waiting state.

The following animation is actualized using the above status switch data.

That is, when the man 42 enters the space 41, the green signal light 44 is turned off, the yellow signal light 45 is turned on and the automobile 43 slows down and stops. These motions of the objects are actualized based on the first status switch data unit shown in FIG. 6. After this, the yellow signal light 45 is maintained in the on state for the predetermined time. When the yellow signal light 45 is turned off, the red signal light 46 is turned on. These motions of the yellow signal light 45 and the red signal light 45 are actualized based on the second status switch data unit shown in FIG. 6.

Figure 7:
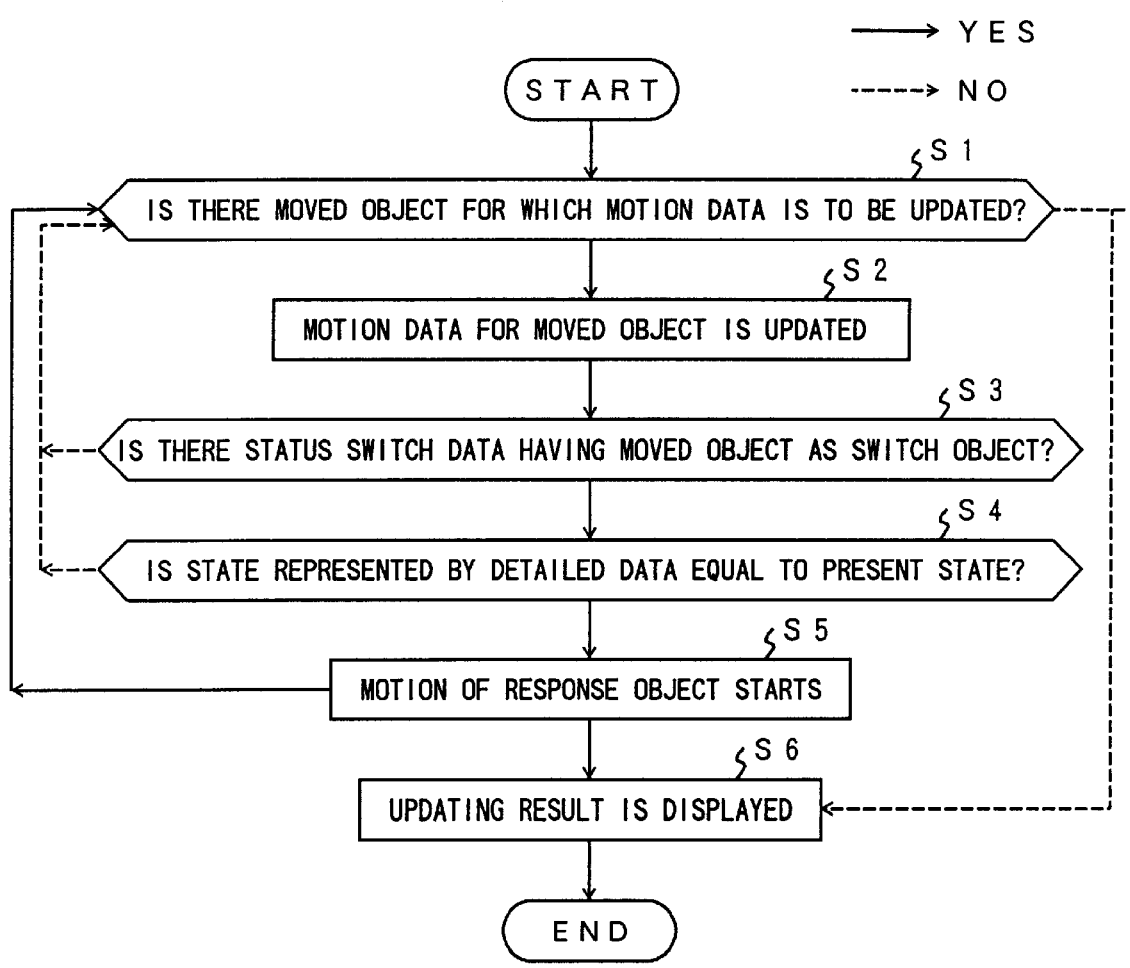
FIG. 7 is a flow chart illustrating a process using the status switch data.

To actualize the above animation, a process as shown in FIG. 7 is executed using the status switch data. Referring to FIG. 7, the object update calculating block 200 shown in FIG. 3 determines, in step S1, whether or not there is a moved object for which motion data is to be updated. If a result "Yes" is obtained in step S1, the object update calculating block 200 updates the motion data for the moved object by a time step Δt in step S2. After this, the status switch checking block 300 shown in FIG. 3 checks the status switch data list as shown in FIG. 6. It is then determined, in step S3, whether or not there is status switch data having an object for which the motion data has been updated as the switch object. If a result "Yes" is obtained in step S3, the status switch checking block 300 further determines, in step S4, whether or not a state represented by the detailed data set in the status switch data list is equal to a present state of the object. If a result "Yes" is obtained in step S4, in step S5, the status switch start processing block 400 shown in FIG. 3 causes a motion of an object listed as the response object in the status switch data list to start or to terminate, in accordance with the response motion data and the waiting status flag. After this the above steps are repeated until it is determined, in step S1, that there is no moved object for which the motion data is to be updated (a result "No" is obtained in step S1). In addition, when a result "No" is obtained in each of the steps S3 and S4, the process returns to step S1.

If it is determined, in step S1, that there is no moved object for which the motion data is to be updated, the process proceeds to step S6. In step S6, the result display block 500 displays the objects based on the updated result (updated motion data).

According to the first embodiment, due to changing the contents of the status switch data list, the CG animation can be easily edited.

A description will now be given of a second embodiment of the present invention. In the second embodiment, motions of objects are controlled using the status switch data and further are based on interference of objects with each other. Functional blocks of the CG animation editing system according to the second embodiment of the present invention are shown in FIG. 8.

Figure 8:
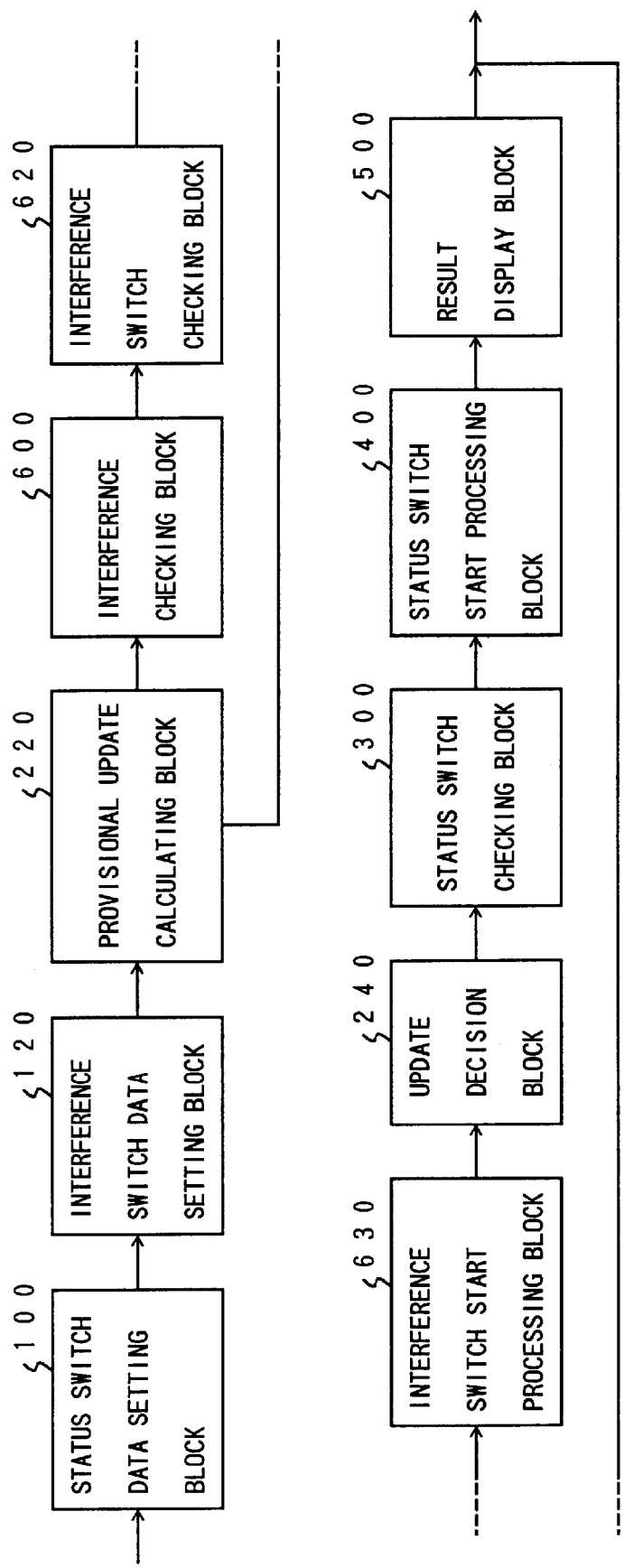
FIG. 8 is a functional block diagram illustrating a computer graphics animation editing system according to a second embodiment of the present invention.

Referring to FIG. 8, the CG animation editing system has the status switch data setting block 100, the status switch checking block 300, the status switch start processing block 400 and the result display block 500 in the same manner as in the first embodiment. The CG animation editing system further has an interference switch data setting block 120, a provisional update calculating block 220, an interference checking block 600, an interference switch checking block 620, an interference switch start processing block 630 and an update decision block 240.

Interference switch data is set in the memory unit 2 (shown in FIG. 1) by the interference switch data setting block 120. The interference switch data represents a response motion of an object which is activated when objects interfere with each other. The function of the object update calculating block 200 shown in FIG. 3 is divided into functions of the provisional update calculating block 220 and the update decision block 240. When it is determined that an object moving in accordance with motion data provisionally updated interferes with another object, the motion data which is provisionally updated is canceled. As a result, for example, only motion data for only an object (e.g., a ball) which does not interfere with a wall is updated so that a motion in which the object is sunk into the wall does not occur in the animation.

Figure 9:
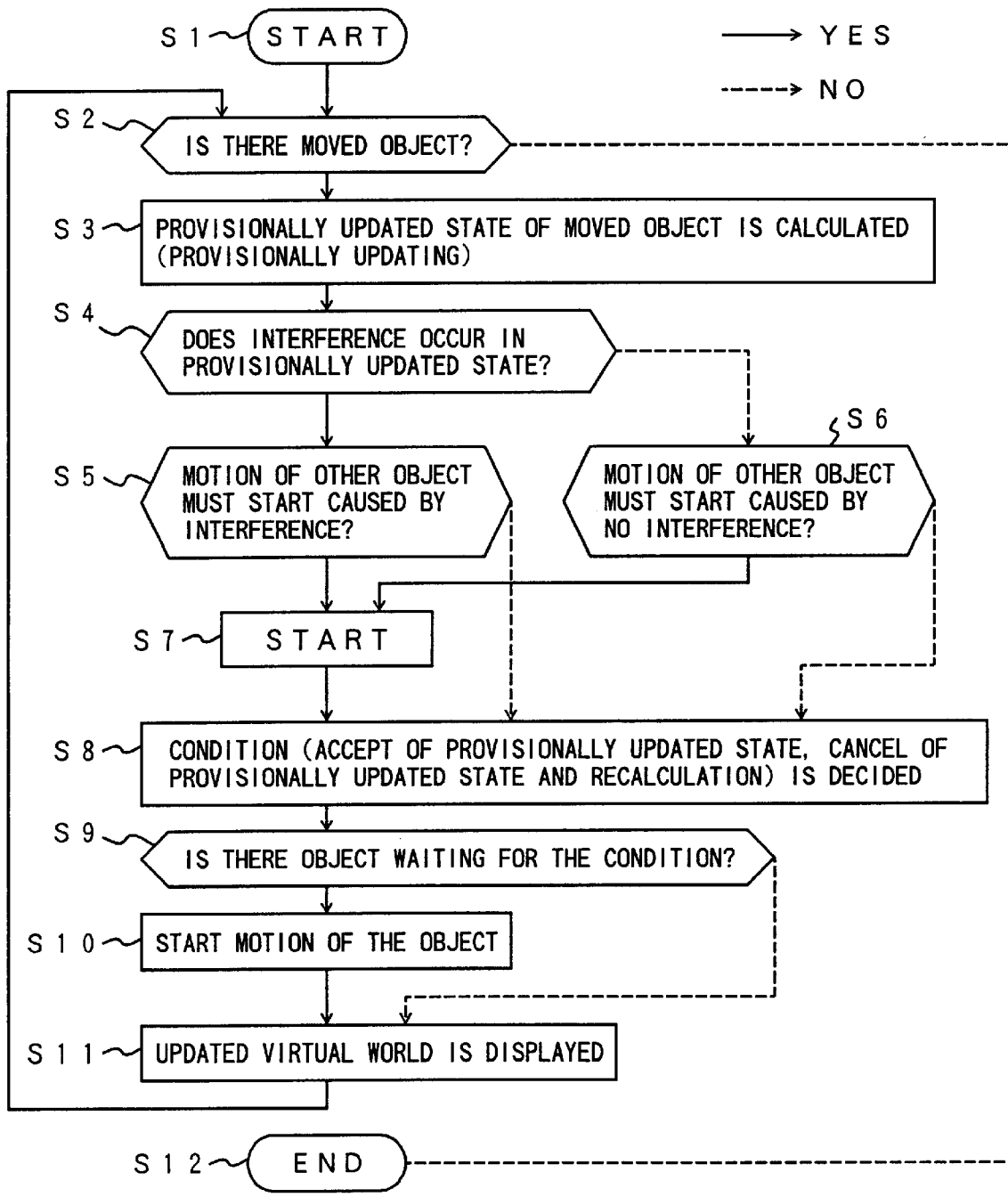
FIG. 9 is a flow chart illustrating a process executed in the system shown in FIG. 8.

A process as shown in FIG. 9 is executed using the status switch data and the interference switch data.

Referring to FIG. 9, when the process starts, the provisional update calculating block 220 determines, in step S2, whether or not there is a moved object. When a result "Yes" is obtained in step S2, the provisional update calculating block 220 calculates a provisionally updated state of the moved object. The provisionally updated state of the moved object is a state of the moved object at the next time step. After this, the interference checking block 600 determines, in step S4, whether or not the moved object in the provisionally updated state interferes with another object. When it is determined, in step S4, that the moved object interferes with another object, the interference switch checking block 620 determines, in step S5, whether a motion of the other object must be started based on the result that the moved object interferes with the other object. On the other hand, when it is determined, in step S4, that the moved object does not interferes with another object, the interference switch checking block 620 determines, in step S6, whether a motion of the other object must be started based on the result that the moved object does not interfere with the other object.

In a case where the result "Yes" is obtained in step S5 or S6, the interference switch start processing block 630 causes a motion of the other object obtained in step S5 or S6 to start in step S7. In cases where the result "No" is obtained in steps S5 and S6 and after step S7, the update decision block 240 decides, in step S8, based on whether the moved object interferes with the other object, either to accept the provisionally updated state, to cancel the provisionally updated state or to calculate an updated state of the moved object again.

After this, the status switch checking block 300 checks a state of the moved object which state is obtained based on the decision in step S9. It is further determined, in step S9, with reference to the status switch data, whether there is an object which is waiting for the moved object to be in the state. If the result "Yes" is obtained in step S9, the status switch start processing block 400 causes a motion of the object obtained in step S9 to start in step S10. After this, a virtual world which is in an updated state is displayed by the result display block 500, in step S11. On the other hand, if the result "No" is obtained in step S9, the process proceeds to step S11.

The above steps are repeated until it is determined, in step S2, that there is no moved object. As a result, the CG animation in which states of the objects are successively updated is displayed as the virtual world by the display unit 4.

According to the above process, for example, an animation as shown in FIGS. 10A–10C is displayed by the display unit 4.

Referring to FIGS. 10A–10C, a room (R) is provided with light source plates (L1, L2, L3, L4 and L5). A ball (B) is moved in the room (R) in directions specified by interactive operations of a user (a moved object). The light source plates (L1, L2, L3, L4 and L5) which are objects waiting for the ball (B) to interfere therewith are located at various positions in the room (R). Brightness of each of the light source plates (L1, L2, L3, L4 and L5) is increased every interference with the ball (B). The room (R) has a door (D) which is an object waiting to be started in a predetermined state. A motion of the door (D) is defined such that the door (D) is opened when the brightness of the door (D) exceeds a threshold level.

In an initial state, the room (R) is completely dark and the door (D) is closed (see FIG. 10A. When the ball (B) hits on a light source plate, the light source plate brightens so that the lightness in the room (R) is slightly increased (see FIG. 10B. When the ball (B) has hit on all the light source plates (L1, L2, L3, L4 and L5) so that the brightness of the door (D) exceeds the threshold, the door (D) is opened.

The process for making the above animation uses the status switch data as shown in FIG. 11.

Referring to FIG. 11, the status switch data list includes a single status switch data unit. In the starting data block of the status switch data unit, the door (D) is defined as the switch object in the first data item. The "texture" is defined as the switch type in the second data item. A switch condition in which a total level of brightness levels of colors R (red), G (green) and B (blue) is equal to or greater than a threshold level is defined as the detailed data in the third data item. A condition "If the switch condition is satisfied, . . . " is defined as the start flag in the fourth data item. In the response data block of the status switch data unit, the door (D) is defined as the response object in the fifth data item. A motion in which the door (D) is pivoted and opened is defined as the response motion in the sixth data item. The waiting status flag in the seventh data item is set in the start waiting state.

Figure 12:
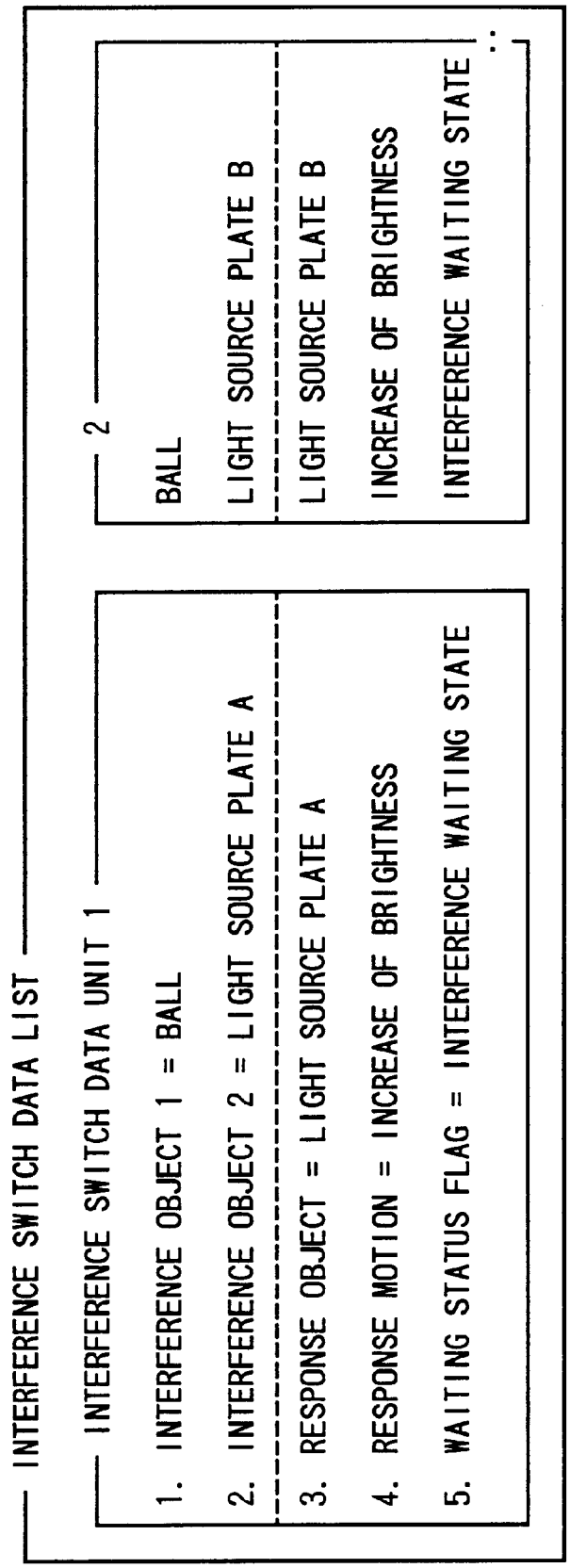
FIG. 12 is a diagram illustrating an example of interference switch data used in the system shown in FIG. 8.

The process for making the above animation uses interference switch data as shown in FIG. 12.

Referring to FIG. 12, an interference switch data list includes a plurality of interference switch data units each of which corresponds to one of the light source plates (L1, L2, L3, L4 and L5). In each of the interference switch data units, the ball (B) is defined as a first interference object in the first data item. A corresponding light source plate is defined as a second interference object in the second data item. The corresponding light source plate is also defined as the response object in the third data item. A motion in which the color brightness of the light source plate is increased is defined as the response motion in the fourth data item. The waiting status flag in the fifth data item is set in an interference waiting state. The interference waiting state is a state in which the corresponding light source plate waits for the ball (B) to interfere therewith.

According to the second embodiment, due to changing the status switch data and the interference switch data, an animation in which motions of objects controlled using the status switching data and the interference switch data can be easily edited.

A description will now be given of a third embodiment of the present invention. In the third embodiment, motions of objects are controlled further in accordance with a time schedule. Functional blocks of the CG animation editing system according to the third embodiment of the present invention are shown in FIG. 13.

Figure 13:
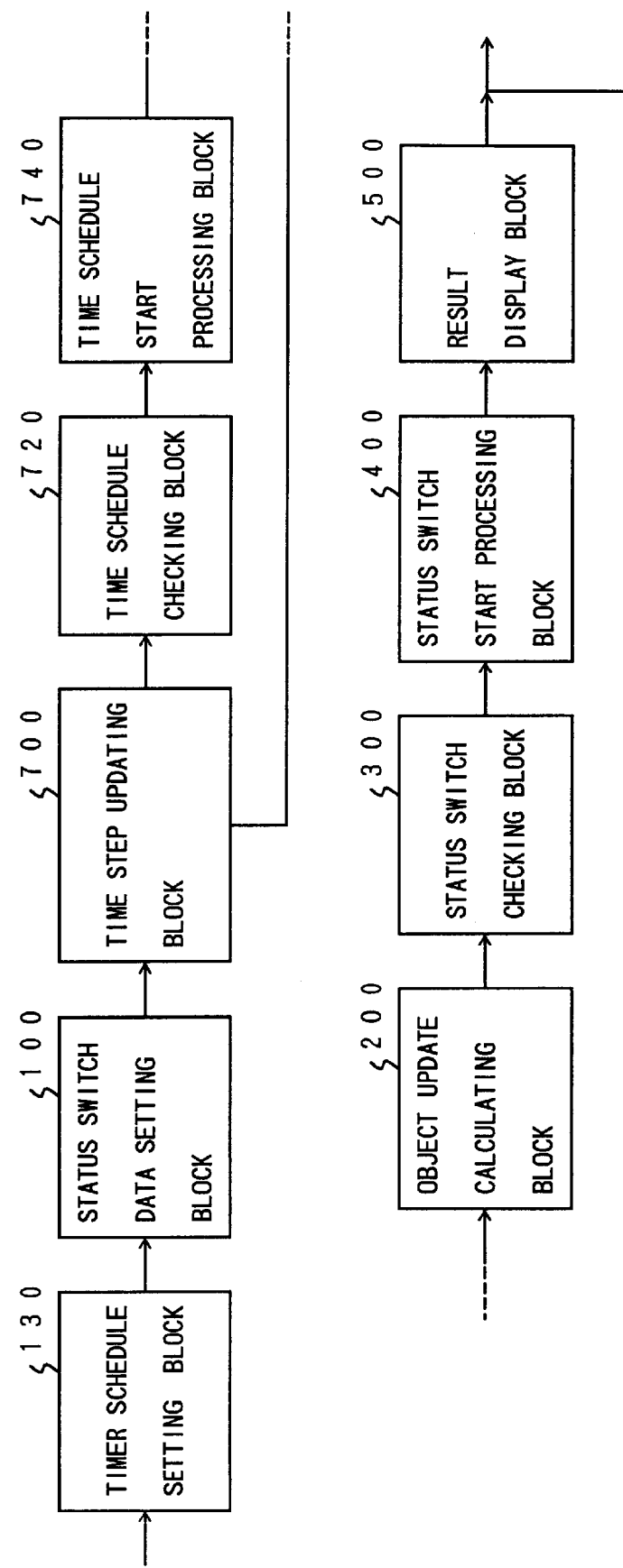
FIG. 13 is a functional block diagram illustrating a computer graphics animation editing system according to a third embodiment of the present invention.

Referring to FIG. 13, the CG animation editing system has the status switch data setting block 100, the object update calculating block 200, the status switch checking block 300, the status switch start processing block 400 and the result display block 500 in the same manner as in the first embodiment. The CG animation editing system further has a time schedule setting block 130, a time step updating block 700, a time schedule checking block 720 and a time schedule start processing block 740.

The time schedule setting block 130 sets time schedule data for respective objects. The time schedule data is stored in the scenario management portion 23 of the memory unit 2 shown in FIG. 2. In the third embodiment, the function of the object update calculating block 200 in the first embodiment is divided into functions of the time step updating block 700 and the object update calculating block 200. The time step updating block 700 updates a reference time step by step. The object update calculating block 200 performs a calculation (an update calculation) for updating states of objects and decides an updated state of each object. The time schedule is searched for a motion of an object which is to be started at a present time step when the previous time step is updated by Δt. The time schedule start processing block 740 and the object update calculating block 200 may be arranged after the status switch start processing block 400.

Figure 14:
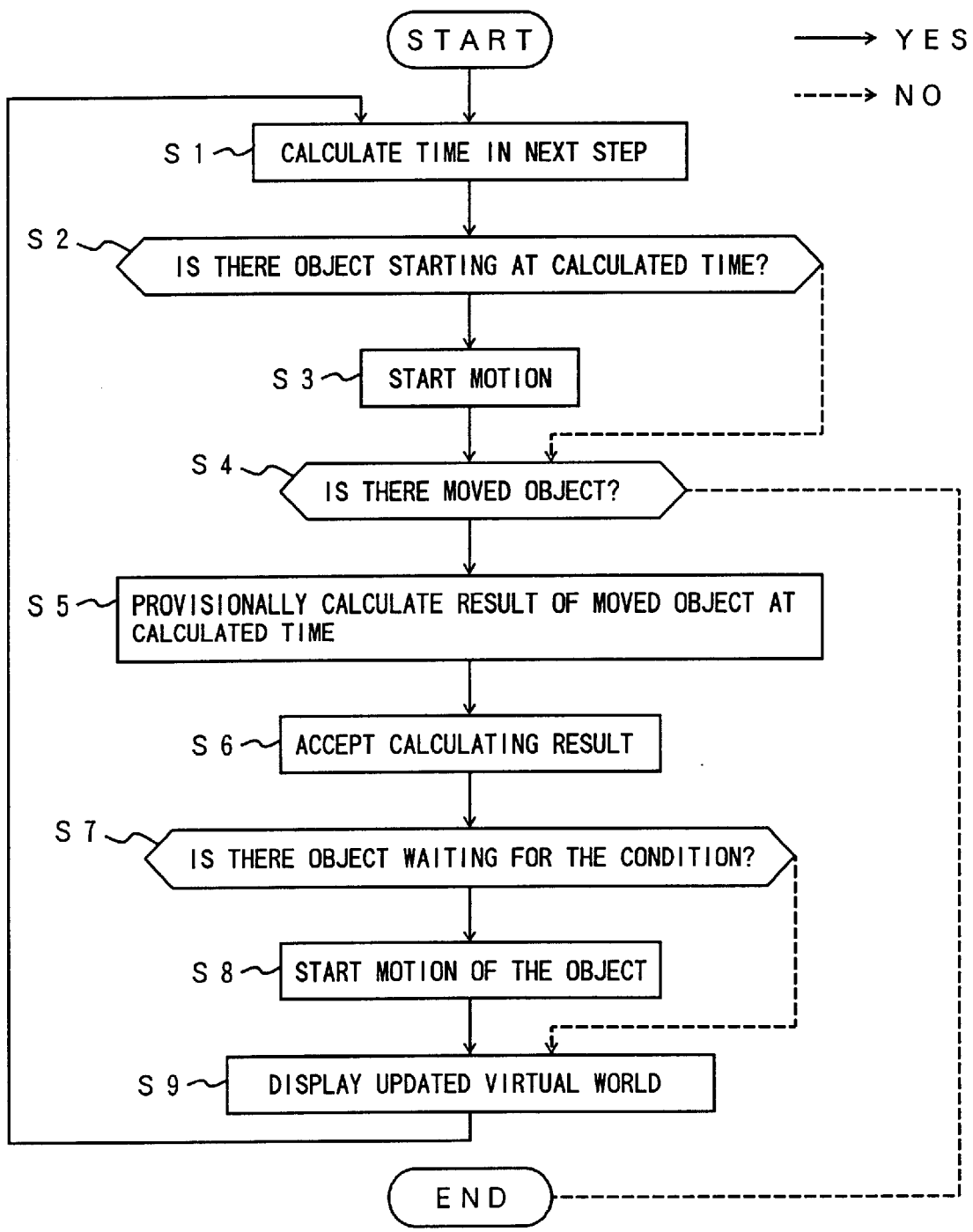
FIG. 14 is a flow chart illustrating a process executed in the system shown in FIG. 13.

A process as shown in FIG. 14 is executed using the time schedule and status switch data.

Referring to FIG. 14, the time step updating block 700 calculates a time corresponding to the next time step in step S1. The time schedule checking block 720 checks the time schedule and determines, in step S2, whether or not there is an object of which motion is to be started at the time calculated in step S1. If there is an object of which motion is to be started, the time schedule start processing block 740 causes the motion of the object to start in step S3. After this, the object update calculating block 200 determines, in step S4, whether or not there is a moved object. On the other hand, if the result "No" is obtained in step S2, the process proceeds to step S4.

If the result "Yes" is obtained in step S4, the object update calculating block 200 further calculates, in step S5, a result of motion of the moved object which is predicted at the calculated time. The object update calculating block 200 accepts the calculated result in step S6. After this, the status switch checking block 300 checks a state of the moved object and determines, in step S7, whether or not there is an object waiting for the moved object to be in the state. If it is determined, in step S7, that there is an object waiting for the moved object to be in the state, the status switch start processing block 400 causes a motion of the object to start in step S8. After this, the result display block 500 displays an updated virtual world on the screen in step S9.

On the other hand, when it is determined, in step S7, that there is no object waiting for the moved object to be in the state, the process proceeds from step S7 to step S9. The above steps are repeated until it is determined, in step S4, that there is no moved object. As a result, the CG animation in which states of the objects are successively updated is displayed as the virtual world by the display unit 4.

Figure 15:
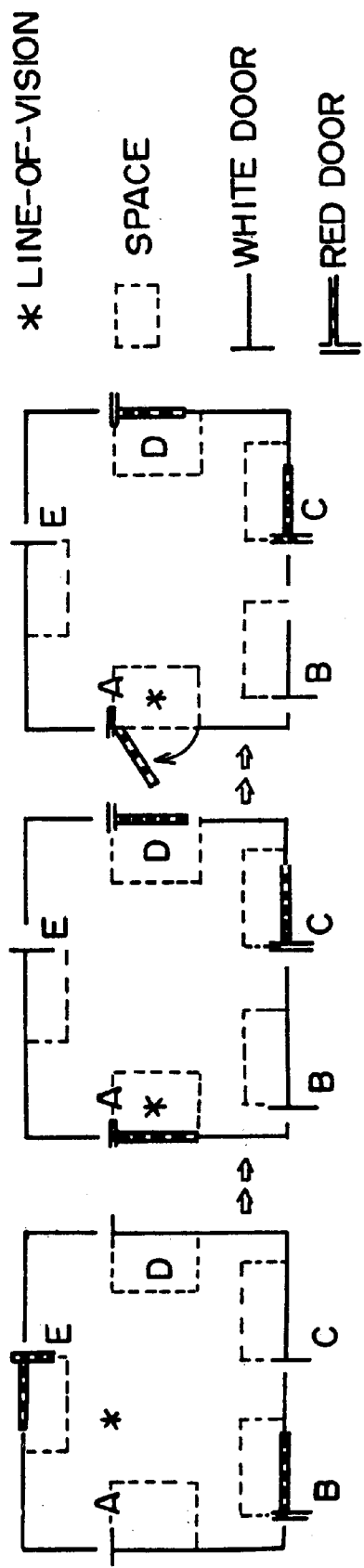
FIGS. 15A, 15B and 15C comprise a diagram illustrating an animation edited by the system shown in FIG. 13.

According to the above process, for example, an animation as shown in FIGS. 15A–15C is displayed by the display unit 4.

In the animation shown in FIGS. 15A–15C, a line-of-vision (*) is defined as an object moving in a room. The line-of-vision (*) moves in the room in directions specified by interactive operations of a user. Doors A, B, C, D and E are defined as objects which are moved in accordance with the time schedule. Motions of the respective doors A, B, C, D and E are started at time intervals, so that the respective doors A, B, C, D and E change from white to red and are maintained in red for a predetermined time before changing back to white. The doors A, B, C, D and E are defined also as objects which are moved based on status switch data. The status switch data represents a motion in which a door is opened when the line-of-vision (*) enters a space in the front of the door.

In an initial state, the doors A, C and D are white and the doors B and E are red as shown in FIG. 15A. The doors A, C, and D change from white to red and the doors B and E change from red to white as shown in FIG. 15B. At this time, when the line-of-vision (*) enters the space in the front of the door A as shown in FIG. 15B, the door A is opened as shown in FIG. 15C. After the door A is opened, the doors A, C and D change back to white and the doors B and E change back to red.

Figure 16:
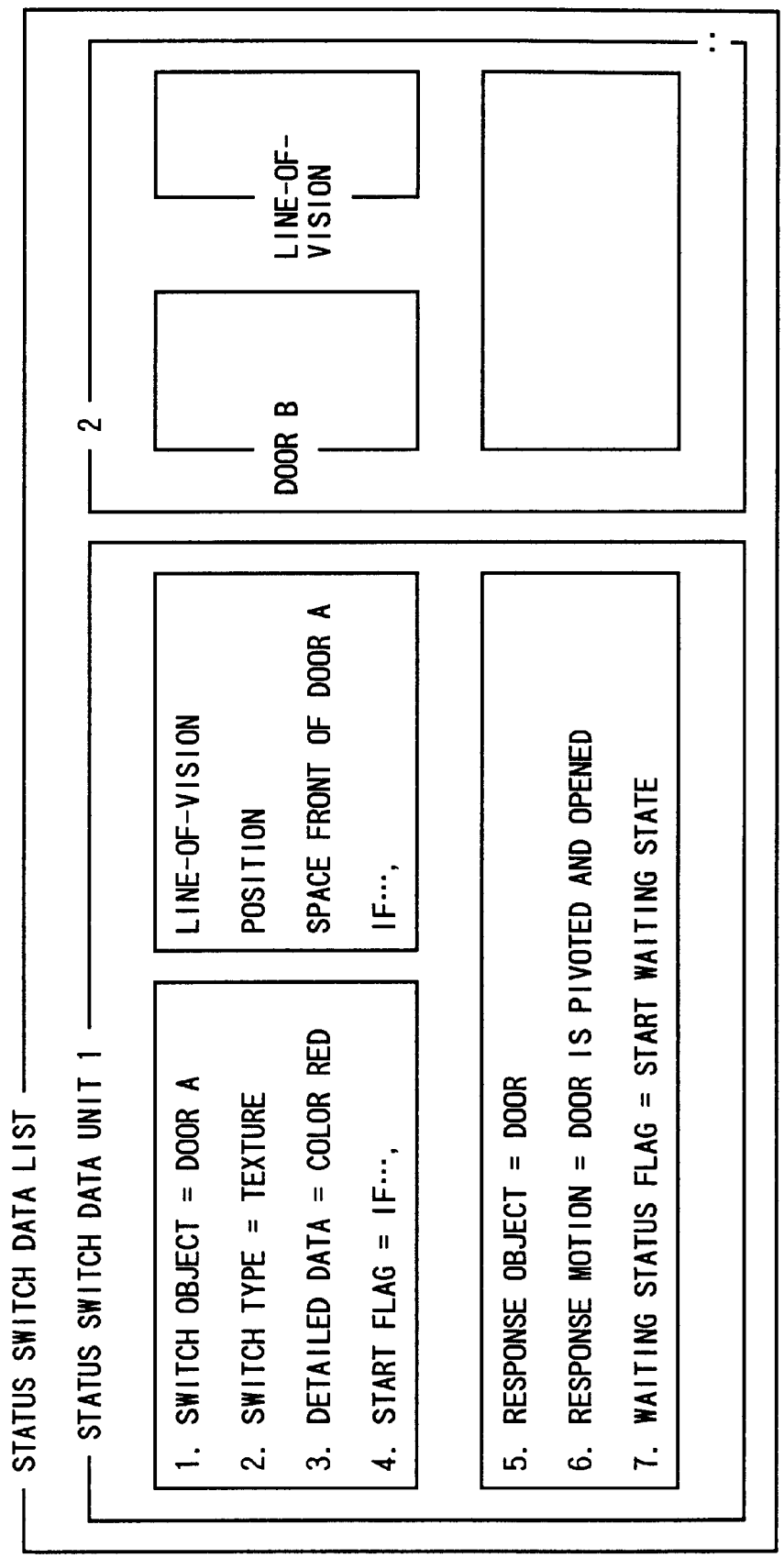
FIG. 16 is a diagram illustrating an example of the status switch data used in the system shown in FIG. 13.
Figure 17:
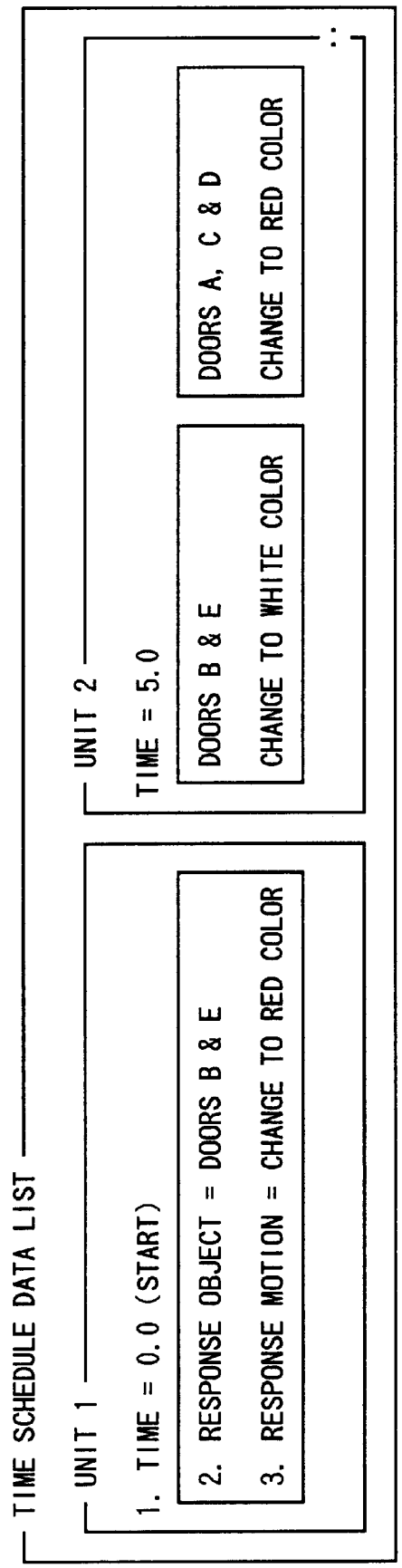
FIG. 17 is a diagram illustrating an example of time schedule data used in the system shown in FIG. 13.

To make the animation as shown in FIGS. 15A–15C, the status switch data as shown in FIG. 16 and the time schedule data as shown in FIG. 17 are used.

Referring to FIG. 16, the status switch data list includes a plurality of status switch data units corresponding to the respective doors A, B, C, D and E. The plurality of the status switch data units have the same structure. A status switch data unit, for example, corresponding to the door A, has two starting data blocks and a single response data block. In one starting data block, the "door A" is defined as the switch object in the first data item. "Texture" is defined as the switch type in the second data item. "Color=red" is defined as the detailed data in the third data item. A condition "if a switching condition is satisfied, . . . " is set as the start flag in the fourth data item. In the other starting data block, the "line-of-vision" is defined as the switch object. The "position" is defined as the switch type. The "space in the front of the door A" is defined as the detailed data. A condition "if a switching condition is satisfied, . . . " is set as the start flag.

In the response data block, the "door A" is defined as the response object in the fifth data item. A motion in which "the door A is pivoted and opened" is defined as the response motion in the sixth data item. The waiting status flag in the seventh data item is set in the start waiting state.

The status switch data lists corresponding to the other doors B, C, D and E have the same structure as that corresponding to the door A described above.

Referring to FIG. 17, the time schedule data has a list structure. The schedule list includes a plurality of units. The first unit is provided with response data which is to be used at a time "0.0". That is, in the first unit, "0.0" (a starting time) is defined as a time in the first data item. The "doors B and E" are defined as the response object in the second data item. A motion of "changing to red" is defined as the response motion in the third data item. The second unit is provided with data which is to be used at a time "5.0". That is, in the second unit, "5.0" is defined as a time in the first data item. The second unit has two response data blocks. In one response data block, the "doors B and E" are defined as the response object in the second data item. A motion of "changing to white" is defined as the response motion in the third data item. In the other response data block, the "doors A, C and D" are defined as the response object. A motion of "changing to red" is defined as the response motion.

According to the above third embodiment, due to changing the status switch data and the time schedule data, an animation in which motions of objects are controlled using the status switch data and the time schedule data can be easily edited.

Figure 18:
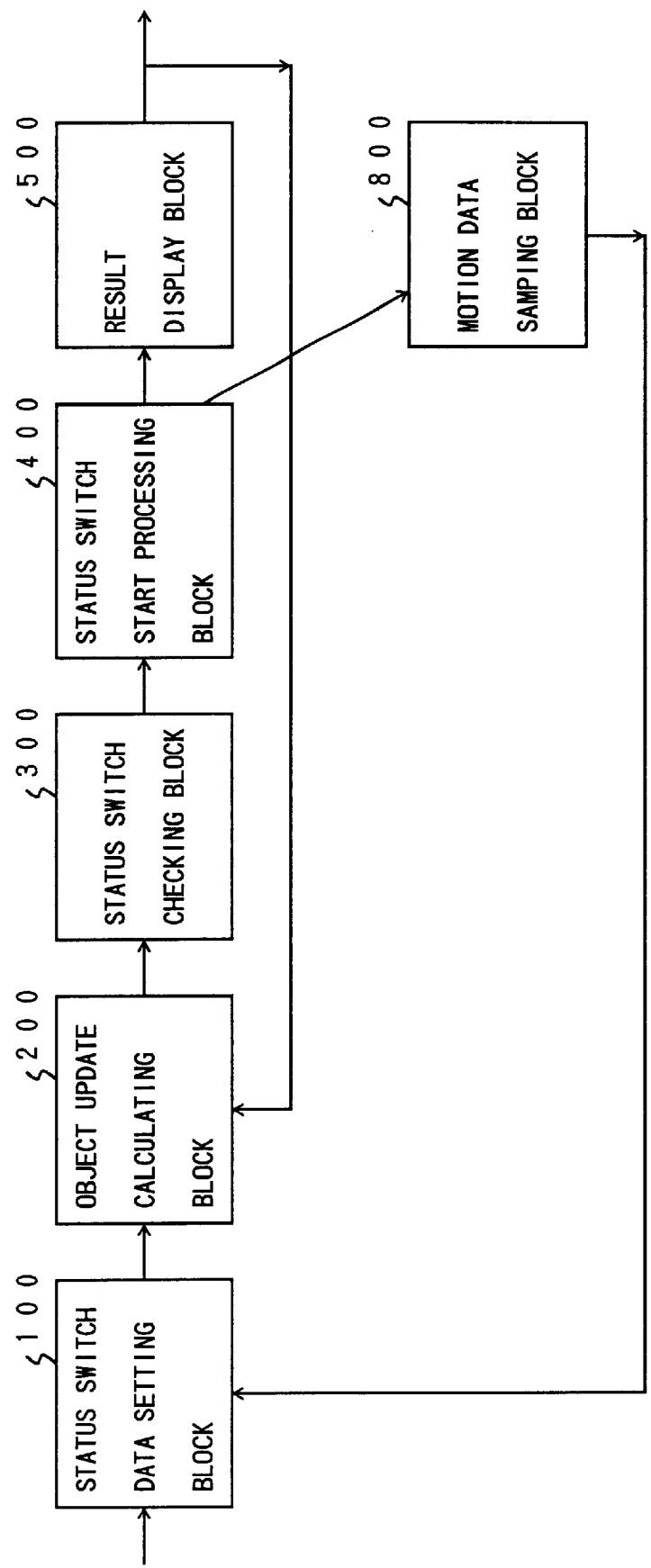
FIG. 18 is a functional block diagram illustrating a computer graphics animation editing system according to a fourth embodiment of the present invention.

A description will now be given of a fourth embodiment of the present invention. Blocks of the CG animation editing system according to the fourth embodiment of the present invention are shown in FIG. 18.

Referring to FIG. 13, the CG animation editing system according to the fourth embodiment of the present invention has the status switch data setting block 100, the object update calculating block 200, the status switch checking block 300, the status switch start processing block 400 and the result display block 500 in the same manner as in the first embodiment (see FIG. 3). The CG animation editing system further has a motion data sampling block 800.

In the fourth embodiment, the object update calculating block 200, the status switch checking block 300, the status switch start processing block 400 and the result display block 500 may be cyclically executed in the same manner as in the first embodiment. The motion data sampling block 800 specifies all or some of objects in a scene which has just been updated and samples attribute values of specified objects. The attribute values of the specified objects are supplied to the status switch data setting block 100 so as to be stored as the status switch data in the rule management portion of the memory unit 2.

Since status switch data can be sampled in an animation as has been described above, complex conditions can be easily set as the status switch data in the system.

Figure 19:
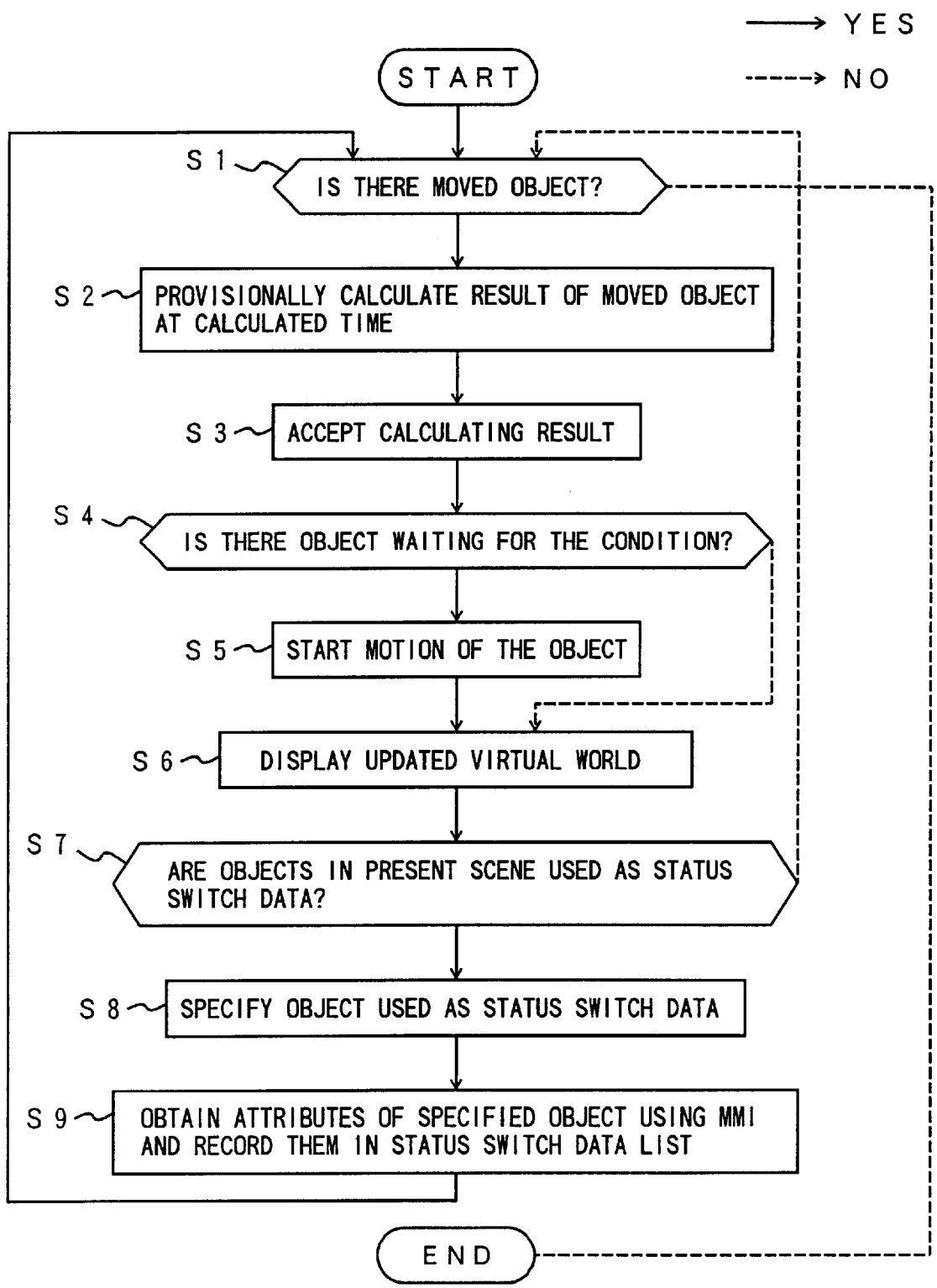
FIG. 19 is a flow chart illustrating a process executed in the system shown in FIG. 18.

In the fourth embodiment, a process as shown in FIG. 19 is executed.

Referring to FIG. 19, the object update calculating block 200 determines, in step S1, whether or not there is a moved object. If the result "Yes" is obtained in step S1, the object update calculating block 200 further calculates, in step S2, a result of motion of the moved object which is predicted at a calculated time. The object update calculating block 200 accepts the calculated result in step S3. After this, the status switch checking block 300 checks a state of the moved object and determines, in step S4, whether or not there is an object waiting for the moved object to be in the state. If it is determined, in step S4, that there is an object waiting for the moved object to be in the state, status switch start processing block 400 causes a motion of the object to start in step S5. After this, the result display block 500 displays an updated virtual world on the screen in step S6.

On the other hand, when it is determined, in step S4, that there is no object waiting for the moved object to be in the state, the process proceeds from step S4 to step S6.

After this, the motion data sampling block 800 determines, in step S7, whether or not states of objects in a scene displayed by the result display block 500 are to be used as status switch data. If the result "Yes" is obtained in step S7, the status switch data setting block 100 specifies objects to be used for the status switch data in step S8. In step S9, the status switch data setting block 100 obtains attributes of the specified objects using a user MMI (Machine-Man-Interface) and records them in the starting data block of the status switch data list.

The above steps are repeated until it is determined, in step S1, that there is no moved object. When it is determined, in step S1, that there is no moved object, the process is terminated (END).

An example of an animation in the fourth embodiment is shown in FIGS. 20A–20D.

In this example, an animation includes a flag and a ball. In the animation, when a user is satisfied with a state where a flag is purple, this state is sampled as data in the starting data block of the status switch data. In this case, the flag is defined as the switch object, and a motion in which the flag changes between red, purple and blue is defined. The ball is defined as the response object. When the flag changes to purple, the ball starts to move.

In an initial trial animation shown in FIG. 20A, the color of the flag is changed every time the user performs a click operation of a mouse. When the user is satisfied with a state where the flag is purple, the animation is stopped (see FIG. 20B), and an editing mode is set. In the editing mode, an editing window is indicated in the screen as shown in FIG. 20C. In the editing mode, the state with which the user is satisfied is sampled. Further, with reference to the sampled state, a status switch data unit used for a motion in which the ball starts to move when the flag changes to purple is made. After this, the animation is restarted.

In the CG animation editing system according to the fourth embodiment of the present invention, the memory unit 2 stores the status switch data list and status sampled data list.

Figure 21A:
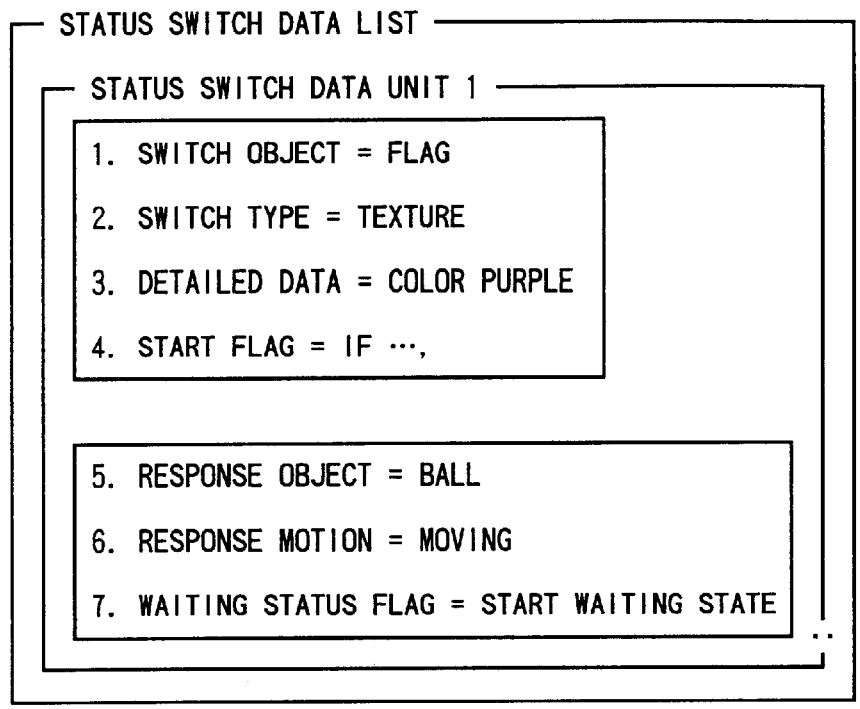
FIGS. 21A and 21B are diagrams illustrating examples of contents of the status switch data.

FIG. 21A shows an example of the status switch data list. Referring to FIG. 21A, a status switch data unit includes a starting data block and a response data block. In the starting data block, the "flag" is defined as the switch object in the first data item. "Texture" is defined as the switch type in the second data item. "Purple" is defined as the detailed data in the third data item. A condition "if a switching condition is satisfied, . . . " is set as the start flag in the fourth data item. In the response data block, the ball is defined as the response object in the fifth data item. A motion in which "the ball moves" is defined as the response motion in the sixth data item. The waiting status flag in the seventh data item is set in the start waiting state.

Figure 21B:
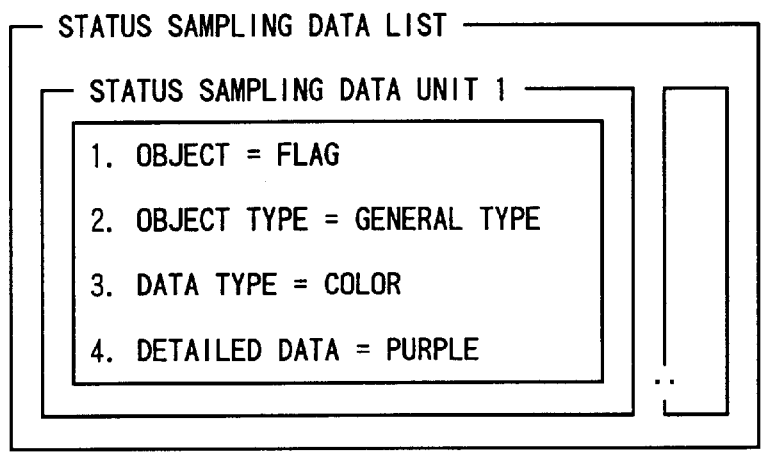

FIG. 21B shows an example of the status sampled data list. Referring to FIG. 21B, a status sampled data unit includes four data items (the first data item through the fourth data item). In the status sampled data unit, the "flag" is defined as the specified object in the first data item. "General type" is defined as the switch type in the second data item. "Color" is defined as the data type in the third data item. "Purple color" is defined as the detailed data in the fourth data item.

FIGS. 22A, 22B and 22C show states of the editing window and an editor in the sampling process.

When the status switch in the global menu is selected by a drag operation of the mouse, a pull-down menu is indicated as shown in FIG. 22A. The pull-down-menu has items: "SWITCH LIST", "SAMPLE LIST", and "SAMPLING". The item "SWITCH LIST" is used to open an editor for a list of status switch data which has been set in the system. The item "SAMPLE" is used to open an editor for sampled objects. The item "SAMPLING" is used to sample specified objects.

When the item "SWITCH LIST" in the pull-down menu is selected, a status switch list editor as shown in FIG. 22B is indicated on the screen. In the status switch list editor shown in FIG. 22B, "NEW" is used to add a status switch data unit to the list, "EDIT" is used to change contents of the status switch data unit, and "DELETE" is used to delete the status switch data unit.

When the item "SAMPLING" in the pull-down-menue is selected and an object on the screen is specified, a status sampling editor as shown in FIG. 22C is indicated in the screen. In this example, the "flag" is specified and information regarding the "flag" is indicated. After "EDIT" in the status sampling editor is selected by a click operation of the mouse, necessary items out of information items indicated in the screen are specified.

A description will now be given, with reference to FIG. 23, of a fifth embodiment of the present invention. In the fifth embodiment, succession of motions are represented using general programs. That is, in order to define a motion of an object, a general program including IF-THEN steps each of which represents a condition and a response is used. Functional blocks of the CG animation editing system according to the fifth embodiment of the present invention is shown in FIG. 23.

Referring to FIG. 23, the CG animation editing system has the status switch data setting block 100, the object update calculating block 200, the status switch checking block 300, the status switch start processing block 400 and the result display block 500 in the same manner as in the first embodiment (see FIG. 3). The CG animation editing system further has an IF-THEN rule setting block 900 and a status switch data translation block 920.

The IF-THEN rule setting block 900 makes a program defining motions of objects in accordance with an IF-THEN rule. The IF-THEN rule (a conditional expression) used in this embodiment includes substantially the same rule represented by different programing languages. The status switch data translation block 920 translates the program made by the IF-THEN rule setting block 900 into status switch data.

In the following IF-THEN step;
"If A is in a B condition, then C acts D",
A and B respectively correspond to the switch object and the switch condition (including the switch type, and the detailed data) of the status switch data, and C and D respectively correspond to the response object and the response motion of the status switch data. In this example, the status switch data translation block 920 translates the IF-THEN step into the status switch data in accordance to the above rule.

The present invention is not limited to the aforementioned embodiments, and other variations and modifications may be made without departing from the scope of the claimed invention.

What is claimed is:

1. A computer graphics animation editing system, comprising:
    storage means for storing a status switch data unit including a starting data block and a response data block, the starting data block indicating a condition of a virtual world, the response data block indicating a response which should occur when the condition indicated by the starting data block is satisfied;
    calculation means for calculating an updated condition of the virtual world;
    checking means for determining whether the updated condition of the virtual world calculated by said calculation means is equal to the condition indicated by the starting data block of the status switch data unit;
    start processing means for causing the response indicated by the response data block to start when said checking means determines that the updated condition of the virtual world is equal to the condition indicated by the starting data block of the status switch data unit; and
    display means for displaying the virtual world including a result obtained by said start processing means.

2. The computer graphics animation editing system as claimed in claim 1, wherein the condition indicated by the starting data block of the status switch data unit is a condition causing a motion of an object in the virtual world to start or to stop.

3. The computer graphics animation editing system as claimed in claim 2, wherein the response indicated by the response data block of the status switch data unit is a starting or a stoping of the motion of the object in the virtual world.

4. The computer graphics animation editing system as claimed in claim 1 further comprising:
    sampling means for sampling attributes of a specified object in the virtual world, wherein the attributes of the specified object sampled by said sampling means are used to make a new status switch data unit.

5. The computer graphics animation editing system as claimed in claim 1 further comprising:
    means for translating an expression used in a program into the status switch data unit indicating the condition and the response.

6. A computer graphics animation editing system, comprising:
    first storage means for storing an interference switch data unit including a starting data block and a response data block, the starting data block indicating objects interfering with each other in a virtual world, the response data block indicating a first response which should occur when interference with the objects indicated by the starting data block starts or stops;
    second storage means for storing a status switch data unit including a starting data block and a response data block, the starting data block indicating a condition of the virtual world, the response data block indicating a second response which should occur when the condition indicated by the starting data block is satisfied;
    provisional calculation means for provisionally calculating an updated condition of the virtual world;
    interference determination means for determining whether the objects interfere with each other in the virtual world under the updated condition calculated by said provisional calculation means;
    start determination means for determining, based on a result obtained by said interference determination means, whether the first response indicated by the response data block of the interference switch data unit should occur;
    interference start processing means for causing the first response to start when said start determination means determines that the first response should occur;
    condition decision means for deciding on a condition in the virtual world, based on existence or nonexistence of interference of the objects, by accepting the result from said provision calculation means, by canceling the result from said provisional calculation means or by recalculating using said provisional calculation means;
    checking means for determining whether the condition of the virtual world decided by said condition decision means is equal to the condition indicated by the starting data block of the status switch data unit;
    start processing means for causing the second response indicated by the response data block of the status switch data unit to start when said checking means determines that the condition decided by the said condition decision means is equal to the condition indicated by the starting data block of the status switch data unit; and
    display means for displaying the virtual world including the result obtained by said start processing means.

7. The computer graphics animation editing system as claimed in claim 6, wherein the condition indicated by the starting data block of the status switch data unit is a condition causing a motion of an object in the virtual world to start or to stop.

8. The computer graphics animation editing system as claimed in claim 7, wherein the second response indicated by the response data block of the status switch data unit is a starting or a stopping of the motion of the object in the virtual world.

9. The computer graphics animation editing system as claimed in claim 6, wherein the first response indicated by the response data block of the interference switch data unit is a starting of a motion of an object.

10. The computer graphics animation editing system as claimed in claim 6 further comprising:

sampling means for sampling attributes of a specified object in the virtual world, wherein the attributes of the specified object sampled by said sampling means are used to make a new status switch data unit.

11. The computer graphics animation editing system as claimed in claim 6 further comprising:

means for translating an expression used in a program into the interference switch data unit indicating the objects and the first response and/or the status switch data unit indicating the condition and the second response.

12. A computer graphics animation editing system, comprising:

first storage means for storing time schedule data indicating a time schedule by which motions of objects proceed step by step;

second storage means for storing a status switch data unit including a starting data block and a response data block, the starting data block indicating a condition of a virtual world, the response data block indicating a response which should occur when the condition indicating by the starting data block is satisfied;

time calculation means for calculating a time in a next step;

schedule determination means for determining, with reference to the time schedule data stored in said first storage means, whether there is an object to be moved at the time calculated by said time calculation means;

scheduled start processing means for causing motion of the object to start when said schedule determination means determines that there is an object to be moved;

calculation means for calculating an updated condition of the virtual world including the moved object;

checking means for determining whether the updated condition of the virtual world calculated by said calculation means is equal to the condition indicated by the starting data block of the status switch data unit;

start processing means for causing the response indicated by the response data block to start when said checking means determines that the updated condition of the virtual world is equal to the condition indicated by the starting data block of the status switch data unit; and display means for displaying the virtual world including the result obtained by said start processing means.

13. The computer graphics animation editing system as claimed in claim 12, wherein the condition indicated by the starting data block of the status switch data unit is a condition causing a motion of an object in the virtual world to start or to stop.

14. The computer graphics animation editing system as claimed in claim 13, wherein the response indicated by the response data block of the status switch data unit is a starting or a stopping of the motion of the object in the virtual world.

15. The computer graphics animation editing system as claimed in claim 12 further comprising:

sampling means for sampling attributes of a specified object in the virtual world, wherein the attributes of the specified object sampled by said sampling means are used to make a new status switch data unit.

16. The computer graphics animation editing system as claimed in claim 12 further comprising:

means for translating an expression used in program into the status switch data unit indicating the condition and the response.

* * * * *

UNITED STATES PATENT AND TRADEMARK OFFICE
CERTIFICATE OF CORRECTION

PATENT NO. : 6,249,293 B1
DATED : June 19, 2001
INVENTOR(S) : Asako Yumoto et al.

Page 1 of 1

It is certified that error appears in the above-identified patent and that said Letters Patent is hereby corrected as shown below:

<u>Title page,</u>
Item [54] title, after "WORLD" insert -- GRAPHICS --.

<u>Column 16,</u>
Line 67, change "stoping" to -- stopping --.

Signed and Sealed this

Fifteenth Day of January, 2002

*Attest:*

*Attesting Officer*

JAMES E. ROGAN
*Director of the United States Patent and Trademark Office*